United States Patent
Israel et al.

(10) Patent No.: US 6,766,307 B1
(45) Date of Patent: Jul. 20, 2004

(54) SYSTEM AND METHOD FOR PROVIDING COMPLETE NON-JUDICIAL DISPUTE RESOLUTION MANAGEMENT AND OPERATION

(75) Inventors: Roy Israel, Roslyn Heights, NY (US);
Willem F. Specht, Merrick, NY (US)

(73) Assignee: clickNsettle.com, Inc., Great Neck, NY (US)

( * ) Notice: Subject to any disclaimer, the term of this patent is extended or adjusted under 35 U.S.C. 154(b) by 0 days.

(21) Appl. No.: 09/568,674

(22) Filed: May 11, 2000

Related U.S. Application Data

(60) Provisional application No. 60/177,133, filed on Jan. 20, 2000, provisional application No. 60/156,169, filed on Sep. 27, 1999, provisional application No. 60/146,677, filed on Aug. 2, 1999, provisional application No. 60/145,158, filed on Jul. 22, 1999, provisional application No. 60/141,650, filed on Jun. 29, 1999, and provisional application No. 60/133,341, filed on May 11, 1999.

(51) Int. Cl.[7] ............................................. G06F 17/60
(52) U.S. Cl. .............................. 705/80; 705/1; 705/37
(58) Field of Search ................................. 705/80, 1, 37

(56) References Cited

U.S. PATENT DOCUMENTS

| | | |
|---|---|---|
| 3,575,747 A | 4/1971 | Adams et al. |
| 3,581,072 A | 5/1971 | Nymeyer |
| 5,077,665 A | 12/1991 | Silverman et al. |
| 5,128,859 A | 7/1992 | Carbone et al. |
| 5,329,447 A | 7/1994 | Leedom, Jr. |
| 5,329,589 A | 7/1994 | Fraser et al. |
| 5,444,615 A | 8/1995 | Bennett et al. |
| 5,615,269 A | 3/1997 | Micali |
| 5,692,206 A | 11/1997 | Shirley et al. |
| 5,794,207 A | 8/1998 | Walker et al. |
| 5,815,392 A | 9/1998 | Bennett et al. |
| 5,878,139 A | 3/1999 | Rosen |
| 5,890,138 A | 3/1999 | Godin et al. |
| 5,895,450 A | 4/1999 | Sloo |

(List continued on next page.)

FOREIGN PATENT DOCUMENTS

| | | |
|---|---|---|
| WO | WO 98/37655 | 8/1998 |
| WO | WO 00/08582 | 2/2000 |
| WO | WO 02/21257 | 3/2002 |

OTHER PUBLICATIONS

Dispute Resolution in International Business. Jan. 22, 1998 http://homepages.utoledo.edu/tle/M2080/Disputes.PDF.*
AllSettle, Copyright 2000—www.allsettle.com (copy of home page is attached).
ClicknSettle, Copyright 1999–2000—www.clicknsettle.com (copy of home page is attached).

(List continued on next page.)

Primary Examiner—James P. Trammell
Assistant Examiner—James A. Reagan
(74) Attorney, Agent, or Firm—Hoffmann & Baron, LLP

(57) ABSTRACT

A system and method for providing complete non-judicial dispute resolution management and operation. The system includes an electronic architecture which receives, sorts, and stores data related to non-judicial dispute resolution. The architecture enables implementation and management of a full range of non-judicial dispute resolution procedures between two or more adverse parties to a dispute. The system is accessible electronically by wired and/or wireless communications. The architecture includes a management module which is configured to receive, sort and store dispute resolution data and to provide an internal continuous compilation of such data and new data generated during non-judicial dispute resolution procedures. The architecture also includes a reckoning module connected to the management module for receipt of dispute resolution data. The reckoning module is designed to implement a selected resolution procedure and to transmit to the management new data generated during the resolution procedure.

173 Claims, 4 Drawing Sheets

U.S. PATENT DOCUMENTS

| | | | |
|---|---|---|---|
| 5,905,975 | A | 5/1999 | Ausubel |
| 5,924,082 | A | 7/1999 | Silverman et al. |
| 5,949,876 | A | 9/1999 | Ginter et al. |
| 5,956,687 | A * | 9/1999 | Wamsley et al. ............... 705/1 |
| 5,983,205 | A | 11/1999 | Brams et al. |
| 6,035,288 | A | 3/2000 | Solomon |
| 6,330,551 | B1 * | 12/2001 | Burchetta et al. ............. 705/80 |

OTHER PUBLICATIONS

CyberSettle, Publication date unknown—www.cybresettle.com (copy of home page is attached).

CPRInstitute, Copyright 2000—www.cpradr.org (copy of home page is attached).

Disputes.org, Publication date unknown—www.disputes.org (copy of home page is attached).

EResolution, Copyright 1999, 2000—www.eresolution.com (copy of home page is attached).

ICourthouse, Copyright 1999–2000—www.i-courthouse.com (copy of home page is attached).

Ilevel, Copyright 1998—www.ilevel.com (copy of home page is attached).

InternetNeutral, Copyright 1997–2000—www.internet.com (copy of home page is attached).

National Arbitration Forum, Publication date unknown—www.arb-forum.com (copy of home page is attached).

NovaForum, Copyright 2000—www.novaforum.com (copy of home page is attached).

OneAccord, Copyright 1997–1999—www.oneaccordinc.com (copy of home page is attached).

Online Mediators, Copyright 1999–2000—www.onlinemediators.com (copy of home page is attached).

Online Ombuds Office, Publication date unknown—www.aaron.sbs.umass.edu/center/ombuds/default.htm (copy of home page is attached).

Resolution Forum, Inc., Publication date unknown—www.resolutionforum.org (copy of home page is attached).

Resolveitnow–Resolute Systems, Inc., Publication date unknown—www.resolveitnow.com (copy of home page is attached).

SettleOnline, Publication date unknown—www.settleonline.com (copy of home page is attached).

SquareTrade, Copyright 1999–2000—www.squaretrade.com (copy of home page is attached).

U.S. Settle Corporation, Copyright 1999—www.ussettle.com (copy of home page is attached).

World Intellectual Property Organization, Publication date unknown—www.wipo.com (copy of home page is attached).

123Settle.com, Copyright 1999–2000—www.123settle.com (copy of home page is attached).

Settle Express Corporation, Publication date unknown—www.settlex.com (copy of home page is attached).

Granat, Richard S., *Creating An Environment for Mediating Disputes On the Internet*, A Working Paper for the NCAIR on On-Line Dispute Resolution, (May 22, 1996) pp. 1–9; see alsowww.unmass.edu/dispute/ncair/granat.htm.

Marquess, Kate, *Point, Click—Settle Quick*, ABA Journal, Apr. 2000, pp 82.

Levin, Amanda, *Online Claim Settlement Services Hit The Net*, National Underwriter, vol. 2, No. 33, Nov. 9, 1998, pp 5, 45.

*NAMSYS The ADR Program Management Software, Version 1.0, Systems Notes*, Copyright 1998 NAM Corporation.

Deedman, Cal et al., "Slate: Specialized Legal Automated Term Extraction," Faculty of Law Artificial Intelligence Research Project, pp. 133–137; (1992).

* cited by examiner

SYSTEM AND METHOD FOR PROVIDING COMPLETE NON-JUDICIAL DISPUTE RESOLUTION MANAGEMENT AND OPERATION

The present application claims priority to six (6) provisional applications identified as follows: U.S. application Ser. No. 60/133,441, filed May 11, 1999; U.S. application Ser. No. 60/141,650, filed Jun. 29, 1999; U.S. application Ser. No. 60/145,158, filed Jul. 22, 1999; U.S. application Ser. No. 60/146,677, filed Aug. 2, 1999; U.S. application Ser. No. 60/156,169, filed Sep. 27, 1999; and U.S. application Ser. No. 60/177,133, filed Jan. 20, 2000. Each of these earlier filed provisional applications are incorporated herein by reference.

BACKGROUND OF THE INVENTION

The present invention relates generally to dispute resolution and more specifically relates to a system for providing complete non-judicial dispute resolution management and procedures.

There are numerous conventional means whereby parties involved in a legal dispute may attempt to resolve such dispute, or settle the case. These means include, for example, using the public court system (including small claims court), or non-judicial dispute resolution. However, the public's confidence in the court system seems to have deteriorated over the years. Moreover, the time required to bring a dispute to resolution has become inordinately long. Finally, and perhaps most import of all, the costs associated with a litigation are very high and, in many cases, discourage a legitimate complainant from seeking redress. Consequently, parties and, thus, the legal community have continuously sought to find "a better way" to resolve disputes than through the courts.

In the age of computerization, attempts have been made within the legal community to streamline handling of disputes on behalf of claimants. For example, U.S. Pat. No. 5,956,687 to Wamsley, et al. discloses a technique for computerized management of a plaintiff's personal injury case. The technique includes establishing works reflective of each phase of a personal injury claim, including a pre-negotiation phase, a technique to generate a demand letter and calculate settlement amounts based on information gathered in the record during handling of the claim. However, the Wamsley, et al. "Personal Injury Claim Management System" does not provide an architecture for operation and management of non-judicially handled claims, and, thus, is sorely bereft of the capacity to service a significant number of disputes arising in our society. (In the context of the present invention, "non-judicial" means originated and/or handled outside of the court system—although a court may be involved at some point in the dispute, e.g., to sign a document, order implementation, etc).

In recent years the attempt to bypass the judicial system has resulted in systems and organizations to settle cases without going to court. As part of procedures developed to carry out settlement, parties have been offered the ability to have a dispute mediated, usually by a third party who can be referred to as a mediator. Mediation permits each party to tell its story and even propose a settlement figure when appropriate (which can be made known or kept secret by the mediator).

Another method of resolving a dispute outside the courts is by arbitration. Arbitration can be carried out by a single arbitrator or by a panel of arbitrators. The procedure used for arbitration can be somewhat complex, depending on the rules of arbitration agreed to by the parties. The level of participation by a mediator or an arbitrator (or panel of arbitrators) can vary widely depending on the scenario selected by the parties. Generally, this rather wide range of unspecified possibilities has been referred to as alternative dispute resolution (ADR).

As part of ADR, or adjunct thereto, parties have, from time to time, participated in blind-bid scenarios which mean that each party to a dispute submits a bid without the other party(ies) knowing its bid. The bids are evaluated with a view to settling the dispute. If the bids are sufficiently close or fall within a pre-arranged relationship, the dispute can be settled. If not, additional bidding can be provoked. Bid reception and evaluation can be effected by a judge, a mediator, an arbitrator, or even electronically. See, for example, U.S. Pat. No. 5,7615,269 to Micali, which describes an electronic communications method for resolving a transaction when bids from at least two parties come within a predetermined relationship. Similarly, an on line dispute resolution company, CyberSettle.Com Inc., has made available a web site which accepts three (3) bids from each party, compares the bids to determine whether they are within an agreed-upon range, and reports settlement or provokes a "last chance" bid.

In any event, even use of the extensive array of non-judicial dispute resolution techniques can prove to be unwieldy and/or cost-ineffective, especially from the perspective of an organization such as an insurance company and/or claims department and/or law firm which handles many (and varied) disputes on behalf of one or more parties. Non-judicial dispute resolution includes so many possible procedural schemes that it unduly complicates standard claim handling in a traditional judicial agency such as those enumerated in the previous sentence. Thus, there is a tremendous need for providing a system whereby a complete array of non-judicial dispute resolution techniques are simultaneously made available and managed.

SUMMARY OF THE INVENTION

The present invention is a unique system which enables adverse parties to conduct and manage a full array of non-judicial dispute resolution. The present invention includes an electronic architecture which receives, sorts, and stores data related to non-judicial dispute resolution. This architecture enables implementation and management of a full range of non-judicial dispute resolution procedures between two or more adverse parties to a dispute. "Full range of non-judicial dispute resolution procedures" includes bid-style negotiations, mediation, and arbitration.

The system can be accessible electronically via wired and/or wireless communications, and is preferably accessible via the internet. In one particular embodiment, the system is accessible over the internet via a link provided in a web site of another entity. When wireless communications is used for access, any viable frequencies available from the electromagnetic spectrum can be used, e.g., radio frequency, microwave, UHF, and other frequencies.

The architecture itself includes a management module, configured to receive, sort and store dispute resolution data and to provide internal continuous compilation of such data and new data generated during non-judicial dispute resolution procedures.

The architecture also includes a reckoning module connected to and/or electronically associated with (e.g., including a computerized relationship) the management module for receipt of dispute resolution data, and is designed to implement a selected resolution procedure and to transmit to the management module new data generated during a resolution procedure.

The system can be accessed in response to the biographical data input by at least one of the parties. The biographical data can include personal and/or organization-identification information and/or one or more of an account number, username, a password, etc., and can be verified by the system.

In one embodiment, the access is a tiered leveled access having at least a program manager access and a program user access. The program manager access can include a plurality of selectable actions such as, for example and not limited hereby, adding users, modifying existing user data, transferring active cases from one user to another, activating users, modifying account registration data, browsing all disputes, generating detailed dispute reports, generating summary reports of disputes, browsing dispute resolution cases, as well as other actions which are used by a manager of non-judicial dispute resolutions, and any combination of one or more of the foregoing. The management module can provide relevant data to a program manager in response to an appropriate signal selected by the program manager.

In the case of program user access, a plurality of selectable options can be made available such as, e.g., adding a dispute, responding to a dispute, browsing disputes, generating dispute reports, generating summary reports, as well as any other options required by a case manager of a dispute and any combinations of one or more of such options. Other options can be included and the possibilities are not limited by those set forth above. The management module provides relevant data to the program user in response to the options selected by the user.

A further aspect of the present architecture is an administrative personnel access which enables required administrative personnel to select from one of a plurality of selectable choices. Such choices can include, but is not limited to, informing the parties of disputes submitted to the system which request their response, informing users of settled disputes, marking disputes active, generating prior dispute lists, generating activity reports for the system, providing billing information, generating summary reports for any or all accounts within the system, generating audit reports to ensure that the system is functioning properly, and any other choices required of an administrative personnel, and any combination of the foregoing. The management module provides relevant data to the administrative personnel in response to one or more of the choices selected by such personnel.

The management module of the present invention can also provide operational support to be used in connection the non judicial proceeding(s). For example, the system can provide reporting services in the event the proceedings require such services, e.g., in the event mediation or arbitration proceedings requiring a "record" are used. The reporting services can be called upon for both on-line and off-line proceedings, and can include stenographic services, and all types of electronic reporting services such as audio, video, etc.

Another operational support available in the present invention is translation services and/or interpretation services. This support can also be rendered on-line or off-line, and can be made available for all types of non-judicial proceedings and possible in the present system.

Yet another operational support provided in the management module of the present invention is a vast array of structure settlement arrangements. For example, and are not limited hereby, a settlement arrangement can be structured for a pay out over time and/or fully funded by a third party (e.g., lending institution, factor, etc.). Moreover, the structured settlement feature of the invention can be made available at any time before, during, and/or after the non-judicial resolution proceeding(s).

The architecture also provides to the user a "settle-only" access. "Settle-only" access enables a party to a dispute to access the system for purposes of only attempting to resolve that dispute via the system and does not allow access to the management capabilities of the system. However, all data input by a "settle-only" user is routed through the management module for proper storage of data. Therefore, in response to settle-only access by a user, the management module provides relevant data to the reckoning module. Moreover, the system displays only the relevant data to a settle-only access user.

The architecture of the present invention further includes a claims-data storage and retrieval system which retains data relating to non-judicial dispute resolution and enables retrieval of data by category. The categories in the retrieval system include, but are not limited to, description of the nature of the dispute, settlement amount, venue, type of injury, body part injured, sex, age, occupation, geographical data, and any combination of one or more of the foregoing categories, and any other information capable of being stored in a data bank in an electronic system, e.g., computer system. Preferably the storage and retrieval system data is confidential.

Once the mode of non-judicial dispute resolution is selected, the management module provides relevant data to the reckoning module in response to the selection by one or both of the parties. When the resolution procedure is a bid-style negotiation, one or both of the parties can select either a "blind bid" or an "open bid" type of negotiation.

A profile prompter prompts a party selecting a dispute resolution procedure to indicate whether or not it is a plaintiff and/or defendant. The responding party also provides information in response to a prompt indicating the profile of the responding party. Depending on who the party is, i.e., plaintiff or defendant, the party then provides either a demand (as a plaintiff) or an offer (as a defendant). "Demands" and "offers" and "bids" as used herein can include any matter which can be construed as "consideration" sufficient to support a promise or a contract. Consideration is something of value, e.g., an advantage, however slight, to one party, or an inconvenience, even though trifling, to one party. Consideration (considered as a proffer synonymously herein with "bid," demand," and "offer") can be, but is not limited to, monetary and non-monetary assets, ownership rights, personal rights, custody rights, liability and percentages thereof, etc.

Furthermore, the reckoning module preferably provides a pre-selected criteria for comparing the demand and the offer to determine whether or not the dispute can be resolved. If the pre-selected criteria is satisfied, the system can send a notification to the plaintiff and/or defendant of resolution.

Of the pre-selected criteria, the system can resolve the dispute for the value of the demand if the value of the demand is less than or equal to the offer, or, for the average between the demand and the offer if the demand is within a pre-selected percentage of the offer. For example, a pre-selected percentage range can be from about 5% to about 35%.

The system can also ask that the defendant provide a high value and low value to establish a resolution range. In this case, the dispute can be resolved for the value of the demand if the demand is between the high value and the low value of the range, or, for the low value of the resolution range if the demand is equal to or less than the low value. In this case, the low value can be a fixed value whereas the high value can be a changing value.

Other non-judicial dispute resolution procedures include on-line mediation and arbitration and off-line mediation and arbitration. On-line proceedings can be real time such that all parties and a mediator(s) or arbitrator(s) are in communication simultaneously. On-line proceedings are not limited to a real time scenario, and can be conducted via a format which permits delayed responses. Such formats can include, but are not limited to, chat room(s), bulletin board(s), etc. Off-line proceedings can be "in-person" and "not-in-person." In all of the aforementioned proceedings relevant material, such as evidence, can be transmitted electronically, again via wire and/or wireless communication (each party can also submit material via mail, delivery service, courier, etc.). Moreover, all or even a portion of the proceedings can be conducted via video transmission.

As the resolution procedure progresses, the reckoning module transmits new dated generated to the management module for compiling, sorting and storing. When the non-judicial dispute resolution procedure is a mediation, the management module provides relevant data to a mediator in response to a mediation selection. The mediation can be real-time on-line mediation wherein information (evidence or otherwise ) can be transmitted to the mediator electronically, e.g., by fax, by phone, video, and by computer (e-mail) when available, etc. When the mediation is off-line, at least some of the necessary information can be transmitted on-line by the same modes set forth above.

Similarly, when the non-judicial dispute resolution procedure is an arbitration, the management module provides relevant data to an arbitrator, or a board of arbitrators, in response to the selection to arbitrate. When the arbitration is real-time on-line arbitration, information (which can include evidence) can be sent electronically by telephone, fax, video and via computer (e-mail) when available, etc. When the arbitration is off-line, at least some of the information can be sent on-line by electronic communications.

It should be fully noted, that the system provides the ability of the non-judicial dispute resolution in the present case to respond to an election by one or more of the parties to move to a different non-judicial dispute resolution procedure regardless of the one which is chosen first. The election to go to a different resolution procedure can be made, for example, because the first method chosen has not succeeded.

Thus, one or more of the parties can enter into a bid-style negotiation which may not succeed; advance to a mediated (on or off-line); and/or move to an on or off-line arbitration proceeding. This entire procedure can be conducted seamlessly, that is to say without re-entry of data previously provided. Moreover, by command of the parties, information relating to value of demands and bids can be kept confidential as the parties proceed from one resolution procedure to another. Consequently, a case manager can take advantage of a full range of non-judicial dispute resolution techniques and have the ability to fully manage the case in each, and in all, of the different procedures selected.

While any fee structure can be provided for accessing and using the present invention, a preferred embodiment contemplates a fee structure which financially encourages each of the parties to resolve the dispute. One such structure requires each party to pay a certain amount to participate in the resolution proceeding(s). Thus, the plaintiff must pay a fee for submission of each demand and the defendant must pay a fee for submission of each offer. These fees can also be graduated to correspond to the financial magnitude of the dispute, e.g., a "dog bite" case to a serious injury or even a death case. A variety of schemes can be employed, but this feature of the invention financially rewards resolution and financially penalizes non-resolution by fee structure.

The present invention also includes separate aspects of the system which are unique to managing and conducting non-judicial dispute resolution, such as the system for managing the non-judicial dispute resolution separately (another aspect of it is the electronic architecture for managing non-judicial dispute resolution). Furthermore, the present invention includes the concept of maintaining an on-line real-time updated database for managing non-judicial dispute resolutions which includes the management module configured as described above, e.g., to receive, sort and store dispute resolution data and to provide internal continuous compilation of the data into searchable records. This management module can be updated in response to changes or additions to said compilation of data.

Other aspects of the present invention include, separately, a system for managing non-judicial dispute resolution which includes an electronic interface along with multiple types of access to an electronic architecture as described hereinabove.

The present invention also includes a method of managing non-judicial dispute resolution by providing and maintaining an electronic interface having multiple types of access to an electronic architecture as fully described hereinbefore.

Another aspect of the method of the present invention includes managing non-judicial disputes by providing an accessible architecture set forth above, receiving dispute resolution data from one or more of the parties, storing the data and prompting the parties to implement the full range of non-judicial dispute resolution procedures as also described hereinbefore.

The present invention also includes a method of managing non-judicial dispute resolutions by accessing an architecture having non-judicial dispute resolution data stored therein and retrieving data relating to the dispute, reviewing the stored data to determine if an action is needed, and selecting a plurality of selectable choices and action to be performed with respect to the data.

As a result of the present invention, disputants are able to call upon a full range of dispute resolution techniques without the necessity of engaging in the judicial process. Tremendous advantages are available as a result of this new innovation.

For example, parties no longer are required to avail themselves of the services of counsel. This advantage reduces significantly the cost associated with resolving disputes. Furthermore, in the event the parties do not retain attorneys, at least two additional personalities to the emotional and psychological mix of a dispute would be eliminated, thereby reducing the time usually associated with resolving a dispute.

Another advantage realized as a result of the present invention is that organizations charged with the duty of resolving disputes, e.g., insurance companies, claims departments, law firms, etc. are now able to manage and conduct non-judicial dispute resolution without the necessity of having to provide a complete on-site installation of a non-judicial case management infrastructure. Such infrastructure usually includes docketing systems, electronic (e.g., computer) tracking and reminder systems, etc. The present invention also reduces the need for personal communication between advocates which are required in the absence of such a non-judicial dispute resolution system.

Another advantage of the present invention is the ability to actively negotiate a high volume of cases in a short period of time the present invention virtually eliminates the need to retrieve and review individual "hard copy" files of cases.

Thus, applicants have described what are believed to be some of the advantages of the present invention, but other advantages will be realized in view of the following detailed description and drawings provided hereto. The scope of the invention is set forth in the claims which follow the detailed description.

BRIEF DESCRIPTION OF THE DRAWINGS

These and other features and advantages of the present invention will now be described with reference to the drawings of certain preferred embodiments, which are intended to illustrate and not to limit the invention, and in which.

DETAILED DESCRIPTION

Figure 1:
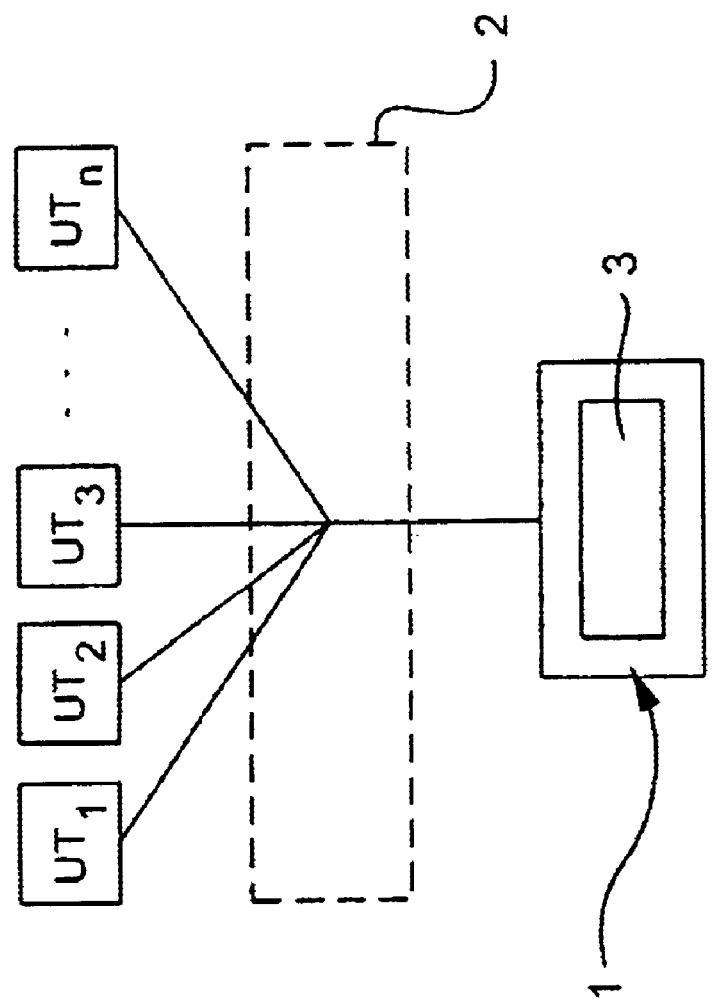
FIG. 1 is a block diagram of the system of the present invention.

The present system enables a party to avail itself of a complete system for managing and engaging in non-judicial dispute resolution. In a preferred embodiment, a party can even enhance its ability to successfully settle a dispute in a non-judicial setting by accessing dispute-settlement information made available by the present invention.

A party can access the inventive system by connecting with it electronically such as, for example, through a web site maintained on the internet. In order to initialize participation in system, biographical information is provided by the user (party) which the system identifies by category, verifies, when appropriate, records as part of its management function, and correlates, when appropriate, to a user code identifying such party. The system, in turn, issues identifying indicia, e.g., account number, user name, password, etc.

Although the purposes of description herein the English language is used at the interface for directions, instructions, prompts, results, etc., the present system is not limited by language and can be adapted to be in any language and/or dialect. Furthermore, the description herein relies on U.S. dollars in its examples, but the present invention is not constrained in scope to a single currency, and can be adapted a for use with any currency.

When the party is an organization such as a company, a law firm, municipality, and individual, the system can, as a part of its management function, provide different levels of identification and use.

Thus, a party inputs data corresponding to a non-judicial dispute resolution, the system sorts, organizes and compiles the data, and enables the party to avail itself of a full range of non-judicial dispute resolution procedures. The system also allows users of the system to organize data corresponding to multiple disputes, manage that data into a form selected by the user, and generate reports based on the data from one or more disputes that have been input into the system to which they are a party. In a preferred embodiment, the present system allows parties to disputes to effectively and efficiently input, sort, organize and manage the data corresponding to disputes, and resolve disputes via the internet.

A dispute, as defined in the present invention, relates to a disagreement or other adversarial relationship between two or more parties. As referred to herein, the parties to a dispute are divided into two main classifications, a submitting party, which is the party who initiates the dispute, and the responding party, which is the party against whom the dispute is directed and is invited to participate in the non-judicial dispute resolution process. Either the submitting or responding party can be plaintiff or defendant.

In one management aspect of the present invention, the submitting party and the responding party access the system and manage all data records which are related to any and all disputes, whether settled or not settled, in which they are parties.

In an operational aspect of the present system, the submitting party and the responding party to a particular dispute can take part in a bid style negotiation by entering consideration into the system for the purpose of reaching a settlement of the dispute. If and when the bidding process does not resolve the dispute, the parties can continue without interruption to other non-judicial dispute resolution procedures, e.g., on or off-line mediation, arbitration, etc. Alternatively, a party can initiate the process using another technique and subsequently engage the bid-style, if desired. These and other aspects of the present invention will be described in greater detail below. The present invention is hereinafter described for use as an internet web-based system. It will be evident to one skilled in the art that, given the following detailed description, that the present invention can be modified for use with any interconnected network which is linked together by a standard set of protocols (such as TCP/IP and HTTP) to form a distributed network. While this type of network is commonly referred to as the Internet, the present invention is contemplated for use with all variations which may be made to the internet in the future, including changes and additions to standard protocols.

Preferably, the present system is accessed by the user via a web browser, such as that described above, which is capable of communicating with the web site or home page which supports and provides access to the architecture of the present system. Typically, the web browser of the user is resident within a user terminal which has a CPU, monitor, keyboard and mouse. The user instructs the web browser to seek out and display the web site of the present system. When the web server is accessed, the web site for the present system is displayed.

Further, the system of the present invention can be accessed by providing a "hot link" embedded within the web site of another entity. With this arrangement, a user, who is actively viewing the web site of another entity, can easily select the "hot link" corresponding to the present system. A "hot link" as defined in the present invention can be an embedded URL code or other indication means which, with its selection, instructs the web browser of the user to seek out a specified web page(s) which interact with the present system. This "hot link" feature is especially useful when the web site of another entity is engaged in a business where disputes may occur, such as, for example, a web site which sells goods or services. The purchaser, vendor or web site entity itself may wish to provide access to the present system via a "hot link" as an avenue for submitting, organizing and managing the data related to the dispute, and for possibly conducting an on-line settlement of that dispute. The management capabilities of the present system with relation to organizing, sorting and compiling the data relating to disputes will be useful for web site entities in tracking and reporting the disputes that have arisen out of activities originating from their web site. The reporting and organizing of this data will enable the web sites to determine if problems exist with any one particular customer or vendor and their goods or services.

After the user accesses the web site and it is displayed, if the user is a new user to the system, they are directed to register with the system to obtain an account number, a username and a password. During the registration process, the user is requested to input relevant biographical information such as, name, address, phone number, e-mail, etc. Once the registration data has been submitted to the system, the system reviews the information and confirms the validity of the entered data. Review of the registration data can be effectuated by the system itself, by an additional dedicated physically distinct computer system, or by an actual system staff member. As will be appreciated by those skilled in the art, other forms of registration may be used, including but not limited to regular mail and electronic mail.

If an invalid registration is detected, for example, one which was entered solely out of curiosity, the registration may be deleted from the system so as to free-up system resources. Once the information submitted to the system is verified, the username and password are activated for that user and that user can then access the system.

If a user accessing the system already has a username and password, they can proceed to sign-in. A user attempting to sign-in to the system is prompted to enter a valid username and password. When a valid username and password are entered, the user is given access to the system's management and dispute resolution capabilities.

Referring now to the drawings, FIG. 1 shows one embodiment of the system of the present invention. The system, generally referred to as 1, is configured for access by one or more user terminals ($UT_1$, $UT_2$, $UT_3$ . . . $UT_n$). The user terminals can be directly linked to the system, or, preferably are linked to the system via the Internet 2. Preferably, the present invention resides on a state of the art, high-performance computer server connected to the Internet via a high speed communications line. However, it is contemplated that the present system can be configured for access via other forms of electronic or wireless communication, such as, radio frequency, microwave, UHF and other frequencies selected from the electromagnetic spectrum.

The system of the present invention includes an electronic, preferably a computer-based, architecture 3 for managing data relevant to non-judicial dispute resolution, for conducting non-judicial dispute resolution and/or for transmitting dispute resolution data for use in any of the non-judicial dispute resolution procedures. The architecture 3 allows the parties to a dispute to input the data relevant to the dispute, organize, compile and store the data, query the data, update the data with any additional data generated during a resolution procedure via the system, and generate detailed reports for any and all cases with which the party requesting the report is a party.

Management Module

Figure 2:
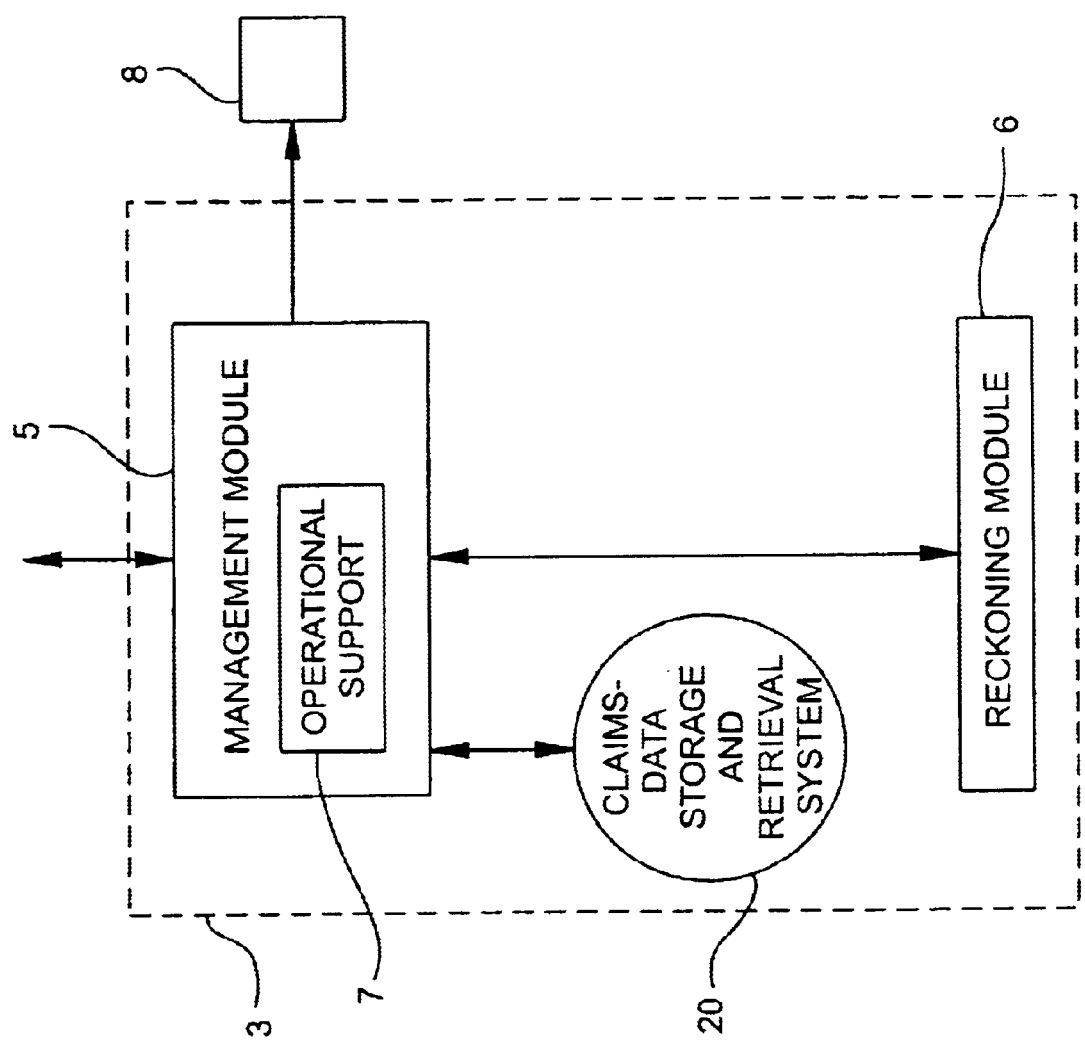
FIG. 2 is a block diagram of the architecture of the system of the present invention.

As is seen with reference to FIG. 2, the architecture 3 of the present invention includes a management module 5 configured to receive, sort and retrievably store dispute resolution data and provide an internal continuous compilation of that data. In response to received data, the management module 5 identifies, sorts, compiles, organizes and stores the data in a queryable, retrievable and transmittable form. In response to received queries, the management module 5 retrieves, sorts and transmits the results of the query to the requestor of the data.

Additionally, the management module 5 is configured to transmit notices to each party to a dispute regarding a change in the status of the dispute, the input of additional data in relation to the dispute, the results of a query of the data contained within management module, or any other information relating to the dispute and/or for transmitting the dispute resolution data to the appropriate entity for mediation and/or arbitration.

The management module 5 is prompted to send the notices/information by an appropriate signal generated in response to receipt of a new dispute, new data for an existing dispute, a query, or a request for the transmission of the data for mediation and/or arbitration. The management module 5 preferably, and as shown in FIG. 2, communicates with the relevant parties to a dispute by sending an e-mail containing the relevant information. It is contemplated, however, that the management module may be configured to send the appropriate notices/information via channels 8 other than, or in addition to e-mail, such as facsimile or regular mail.

For example, in context with the preferred embodiment of the present invention, a dispute is marked as INACTIVE by default upon entry into the system. If a dispute was submitted by a defendant the status of the dispute is set to OPEN by default, indicating that no demands have been placed on it by the plaintiff. If the dispute was submitted by a plaintiff, the status of the dispute is set to NO OFFER by default, indicating that no offers have been placed on it by the defendant.

Further, upon successful retrieval of the dispute, the dispute is marked ACTIVE and the status of the dispute is changed from NO OFFER to OPEN, indicating to the user that demands or offers may be entered on the dispute.

In an effort to provide users of the system with the most up-to-date and pertinent information, the status of the dispute may be changed to Contacted, Initial Offer, Initial Demand, New Offer, New Demand, Final Offer, or Final Demand, to name a few.

The system may also utilize secondary dispute status codes to provide users with a greater level of detailed information. The following secondary dispute status codes may be utilized: Letter Faxed, Left Message, Will Participate, Awaiting Approval, Manual Submit, No Internet, Negotiate Direct, Seeking Policy Limit, Prior Negotiation Failed, Going To Trial, Party Declined, Party Treating, Referred to Mediation, Referred to Arbitration, Limit Reached, Dispute Change, Settled By Parties, Settled by Mediation, Settled by Arbitration, or any other applicable identifying terminology. When a secondary dispute code is changed, the parties are notified.

The use of primary and secondary dispute status codes will allow the users of the system to more efficiently and effectively obtain detailed reporting information because they can sort the dispute data by both primary and secondary dispute status codes.

The management module of the present invention can also provide operational support 7 to be used in connection the non-judicial proceeding(s). For example, the system can provide reporting services in the event the proceedings require such services, e.g., in the event mediation or arbitration proceedings requiring a "record" are used. The reporting services can be called upon for both on-line and off-line proceedings, and can include stenographic services, and all types of electronic reporting services such as audio, video, etc.

Another operational support available in the present invention is translation services and/or interpretation services. This support can also be rendered on-line or off-line, and can be made available for all types of non-judicial proceedings possible in the present system.

Yet another operational support provided in the management module of the present invention is a vast array of structure settlement arrangements. For example, and not limited hereby, a settlement arrangement can be structured for a pay out over time and/or fully funded by a third party (e.g., lending institution, factor, etc.). Moreover, the structured settlement feature of the invention can be made available at any time before, during, and/or after the non-judicial resolution proceeding(s).

To enable the desired operational support, the user selects the appropriate support needed when accessing the system's management module.

With the continuous compilation, organization and retrievable storage of data by the management module 5, a user can easily access the present system to manage all dispute related data, to facilitate an organized transmission of the data for mediation and/or arbitration, or to actually conduct non-judicial dispute resolution. There are many types of access to the present system. Preferably, access to the system is a tiered level access comprising at least a program manager access and a program user access. The authority given to each type of access will be discussed in greater detail below.

It should be noted that the Program Managers and the Program Users access the system typically for the same account. Generally, the Program Managers are individuals at a company, law firm, municipality, etc. (which can be referred to, along with an individual, herein as an "account") who are responsible for maintaining the account with the present system, such as an office manager or information systems personnel. The Program Users are individuals within those companies, law firms, municipalities, etc., who have authority to settle the disputes, such as attorneys or insurance company representatives. Although this is generally the hierarchy within the system, this does not mean that any one individual can not be both a Program Manager and a Program User.

Program Manager Access

Program Managers manage the Program Users and have access to view and prepare reports for each separate dispute or all disputes submitted for their particular account.

Figure 3:
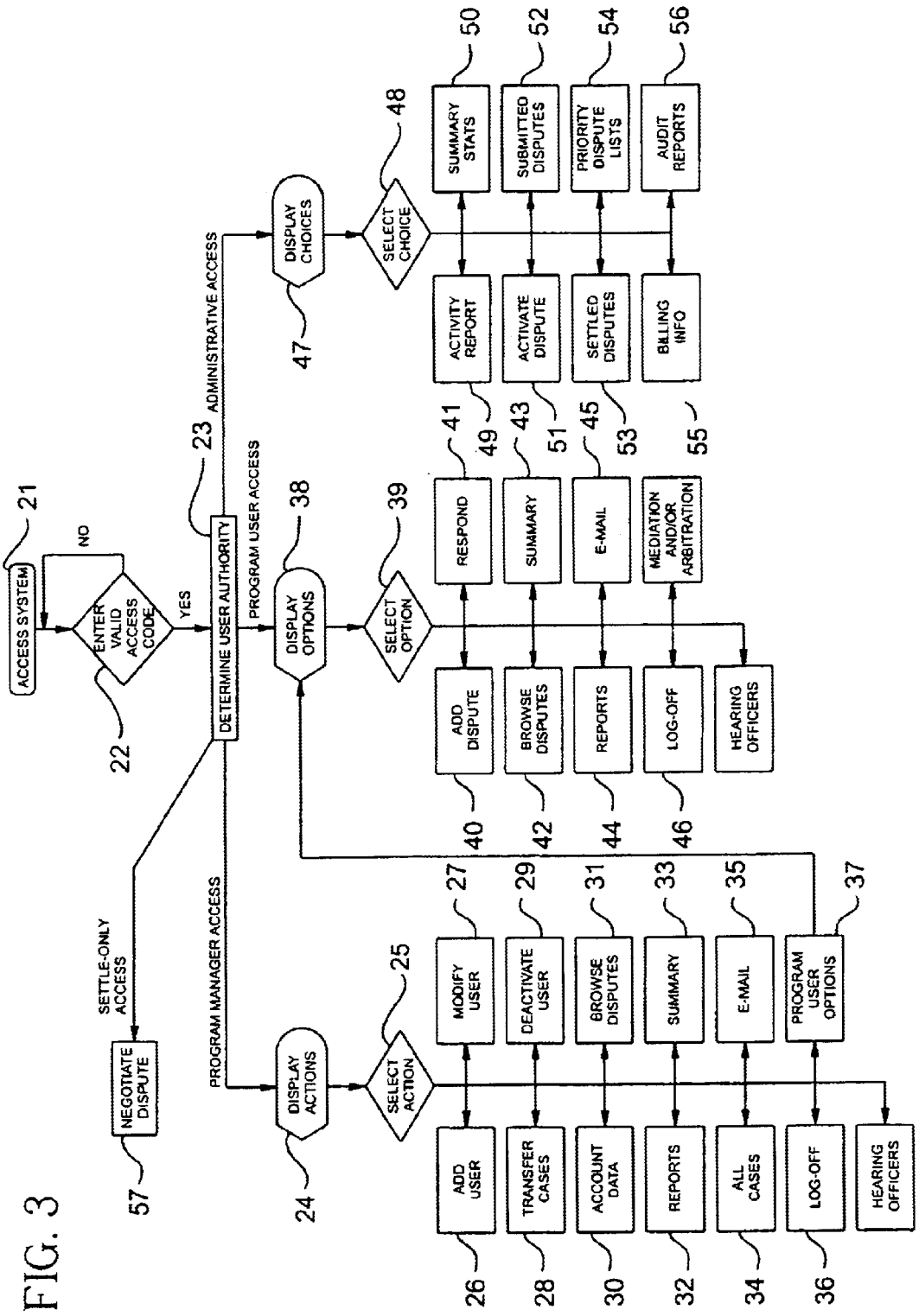
FIG. 3 is a flow chart of the steps for accessing the system of the present invention and various management options available to a user accessing the system.

As seen in FIG. 3, when granted access to the system as a Program Manager, the system prompts the user to select from a plurality of selectable actions 24 from a Program Manager Page of the web site. Depending upon the authority given to the Program Manager, the information and selectable actions provided on the Program Manager Page will vary. These selectable actions may include, for example, add additional users 26, modify the existing user data 27, transfer active cases from one user to another user 28, deactivate users 29, modify any account registration data 30, browse all disputes 31, generate detailed dispute reports for all disputes 32, generate summary reports 33, browse all dispute resolution cases 34, send the system an e-mail 35, and log-off the system 36, and any combination of these actions, or any additional actions which may be provided.

When an action is selected at 25, an appropriate signal is sent to the management module of the system. Upon receipt of the signal, the management module will search the dispute resolution data stored therein for the relevant information, gather that information, sort it into an appropriate form and transmit it to the Program Manager. The relevant information retrieved by the management module will be dependent upon the signal sent by the Program Manager. In other words, each action chosen will be associated with a different query of the dispute resolution data stored within the management module and therefore, retrieve different amounts, quantities and types of information.

In the preferred embodiment of the present system, and as shown in FIG. 3, the Program Manager Page offers the following selectable actions to a Program Manager:

Adding Program Users

Before any Program User may begin to enter disputes into the system, they must be given access to the system by the Program Manager. The Program Manager licks on the "Add User" icon 26 on the Program Manager Page to access the Add User Form. The Add User Form prompts the Program Manager for the input of relevant Program User information such as name of the user, department, telephone number, e-mail address, etc.

After entering all relevant user information, the Program Manager clicks on the "Submit" icon in the Add User Form. After submitting the information, a confirmation screen appears indicating that the individual has been added to the system as a Program User and displays their user name and password. The password may be randomly generated by the system itself, or it may be selected by the Program Manager. This information is then provided to the Program User so that he or she may access the system.

Modifying Program Users

The Program Manager may update Program User data at any time. The Program Manager clicks on the "Modify User" icon 27 on the Program Manager Page to access a Program User List, sorted by User Last Name and User First Name. By clicking on any Program User listed, an Update User Form appears. Within this form, the Program Manager may update and change any and all data previously entered for a Program User. After the appropriate changes have been made, the Program Manager may save those changes by clicking on the "Submit" icon within the form. Thereafter, the Program Manager is notified that the changes have been saved.

Transferring Active Disputes From one Program User to Another

It may be necessary at some point to transfer active disputes from one Program User to another Program User. This may be because the Program User has been terminated or is no longer with the account, or that the Program User is no longer handling dispute activities. Active disputes are those disputes which are either entered by or assigned to a Program User wherein the status does not indicate that the dispute has expired, settled or did not settle. A more detailed discussion of the status of a dispute will be provided below.

Transferring disputes from one Program User to another may also be used when a Program User has changed from one department to another within the company, or firm.

When a person changes departments, they may be added to the system as a "new" Program User with all of their original data, except with a different listed department. All disputes may then be transferred from the "old" Program User to the "new" Program User, even though they are the same User. The "old" User may then be deactivated (discussed in greater detail below). This procedure allows for the movement of Program Users from one department to another while, at the same time, retaining historical data on the disputes assigned to the "old" User and department.

To transfer disputes, the Program Manager clicks on the "Transfer Cases" icon 28 on the Program Manager Page to access the Transfer Disputes List. The Program Manager then clicks on the Program User from whom they wish to transfer a dispute(s). If there are no cases to transfer, a message will appear indicating such. If there are disputes which can be transferred, a Program User to Transfer Disputes To List appears. To avoid improper selection of a Program User to transfer disputes to, the identical Program User selected is not displayed on this list. The Program Manager then clicks on the applicable Program User to transfer the dispute. Thereafter, the Program Manager will be notified that the dispute(s) have been successfully transferred from one Program User to another.

Deactivating Program Users

The Program Manager may deactivate a Program User at any time. For example, a Program User who has no active disputes may be deactivated. To deactivate a Program User, the Program Manager clicks on the "Deactivate User" icon 29 on the Program Manager Page to access the Deactivate User List. From this list, the Program Manager clicks on the Program User they wish to deactivate. If the Program User selected still has an active dispute a message will appear indicating such, and no action will be allowed to be taken. If the Program User has no active disputes within the system, a message will be shown to the Program Manager indicating that the Program User has been deactivated.

Modifying Account Registration Data

The Program Manager may, at any time, update the account registration data. This may be necessary if address, telephone, fax number, Program Manager, billing contacts, etc., have changed. The Program Manager clicks on the "Account Data" icon 30 on the Program Manager Page to access the Update Registration Form. After the appropriate changes are made, they are saved by clicking on the "Submit" icon within the form. Thereafter, a message will appear indicating that the changes have been saved.

Browsing Account Disputes

This feature allows the Program Manager to browse and sort all disputes that have been submitted to the system by all Program Users within an account. To browse the account data, the Program Manager clicks on the "Browse Disputes" icon 31 on the Program Manager Page to access the Browse Disputes List. Preferably, the Browse Disputes List is displayed to the Program Manager as sorted by Dispute Status. The system, however, can be configured to have the list sorted by any desired criteria.

To display the dispute list by another category, the Program Manager can simply click on the "Sort By" icon. Thereafter, the list can be sorted by any category available, such as dispute, caption, status, claimant, defendant, etc. Additionally, the Program Manager can sort the list by multiple categories simultaneously, if desired. After choosing the sort order, the list will be sorted and displayed accordingly.

Additionally, the Program Manager may also click on the "Find Dispute" icon to find a particular dispute. Thereafter, a Find Dispute Form will appear. The Program Manager then inputs characters in any or all of the fields in the Find Dispute Form so that the system can locate the dispute. The fields displayed for searching are, for example, dispute, caption, claimant, defendant, etc. By clicking on the "Submit" icon within the form, the system is prompted to search for any matching disputes and display only those disputes which match the entered characters.

Further, at any time the Browse Dispute List is displayed, detailed data on any particular dispute may be displayed by clicking on that particular dispute.

Generating Detailed Account Reports

Program Managers can also create a viewable and printable detailed account report on all disputes submitted by all users within the account. Clicking on the "Reports" icon 32 causes the Report Form to be displayed. By selecting various criteria and sort orders, virtually any variation of a report may be generated.

The criteria used to generate the account reports may include, in a bodily injury dispute for example, the following: all departments/one particular department, all Program Users/one particular Program User, all opposing parties/one particular opposing party, all dispute types/one particular dispute type, all venues/one particular venue, all injury types/one particular injury type, all primary body parts injured/one particular primary body part injured, all disputes/only active disputes, etc. For other types of disputes, other relevant criteria may be used to generate account reports.

Further, the sort order may be arranged in any desired manner, such as, for example, department/Program User/dispute; Program User/dispute; department/Program User/status; Program User/status; department/Program User/dispute type; Program User/dispute type; opposing party/claim; and opposing party/status. The system, however, enables the requested information to be arranged and displayed in any desired order. After the Report is generated, the Program Manager can print the Report.

Generating Summary Account Case Reports

Program Managers may further elect to create viewable and printable summary reports on all cases submitted by all users within the account. Clicking on the "Summaries" icon 33 causes the Summary Report Menu to be displayed.

The Program Manager may elect to view summary statistics sorted, subtotaled and totaled by any of the following qualifying criteria including, but not limited to: user within department, user, dispute type, primary injury, primary body part injured, venue, opposing party, or any other qualifying criteria within the system. The Program Manager may also elect to view summary statistics based on any combination of the following quantifying criteria including, but not limited to: number of disputes, number of disputes activated, number of disputes engaged, number of disputes settled, percentage of disputes settled, total monetary value of disputes settled, average monetary value of disputes settled, or any other quantifying criteria within the system.

Browsing All Dispute Resolution Cases

As stated above, dispute resolution data can be entered into the system, organized, sorted, compiled and transmitted to the appropriate personnel for use in mediation and/or arbitration proceedings.

To browse the mediation and arbitration cases, the Program Manager clicks on the "All Cases" icon 34 on the Program Manager Page to access the All Cases List. By default, the list is sorted by Case Status. The sorting criteria, however, may be changed to provide a display customized to the Program Manager's particular needs.

Similar to the browsing of account disputes, the Program Manager clicks on the "Sort By" icon to sort the list. Thereafter, the system displays the information requested in the sort order requested. Further, the Program Manager can sort the list by multiple categories simultaneously, if desired. After choosing the sort order, the list will be sorted and displayed accordingly.

Additionally, the Program Manager may also click on the "Find Case" icon to find a particular case. Thereafter, a Find Case Form will appear. The Program Manager then inputs characters in any or all of the fields in the Find Case Form so that the system can locate any mediation or arbitration cases which match the input characters. The fields displayed for searching are, for example, case type, caption, claimant, defendant, etc. By clicking on the "Submit" icon within the form, a signal is sent to the management module instructing it to retrieve any matching mediation or arbitration cases and transmit those cases to the Program Manager.

Further, at any time the All Case List is displayed, detailed data on any particular case may be displayed by clicking on that particular case.

Analyzing Hearing Officers for Mediation(s) and/or Arbitration(s)

The Program Manager may select to analyze settlement data for all mediation and/or arbitration cases for a particular Hearing Officer. The data analyzed may include settlement amounts, award data, case status, case type, etc. This will allow program managers to analyze the performance of particular Hearing Officers with respect to particular case types, or any other information available.

Sending an E-Mail

The Program Manager may click on the E-Mail icon 35 from the Program Manager Page at any time to send an E-Mail to the system administrative department. When the E-Mail icon is selected, the system will automatically set the "Send To" field in users E-Mail program to the assigned e-mail address for the system administrative department.

Logging Off

The Program Manager may also choose to "Log Off" the system from the Program Manager Page. To do this, the Program Manager simply clicks on the Log Off icon 36.

Preferably, the present system is designed to automatically log off any Program Manager who has not clicked the mouse or pressed any key on the keyboard for a pre-set period of time, e.g., 30 minutes. This automatic log off is setup in order to free resources to other Program Managers (or Program Users) who may be actively using the system. When automatically logged-off, a Program Manager simply needs to log-in again in order to continue working with the system.

Program Manager as Program User

Additionally, and as shown in FIG. 3, the Program Manager may be provided with access to the system as a Program User 37. When given such authorization, the Program Manager may access the Program User Page and all actions 38 given to a Program User. Use of the system as a Program User is described in detail below.

Program User Access

Those persons who are given access to the system as a Program User are typically the persons who submit disputes and the data related thereto into the system. However, and as stated above, a Program Manager may also be given access to the system as a Program User.

Program Users are provided with access codes comprising a user name and a password. Once provided, a Program User can then log-on to the system. As seen in FIG. 3, when granted access to the system as a Program User, the user is presented with various selectable options 38 from a Program User Page of the web site. Depending upon the authority given to the Program User, the information and selectable options provided on the Program User Page will vary. These selectable options may include, for example, add a dispute 40, respond to a dispute 41, browse disputes 42, generate summary reports 43, generate dispute reports 44, send the system an E-Mail 45, log off 46, or any other options with which the Program User may be allowed to utilize.

When an option is selected at 39, an appropriate message is sent to the management module of the system. Upon receipt of the message, the management module will search the dispute resolution data stored therein for the relevant information, gather that information, sort it into an appropriate form and transmit the same to the Program User. The relevant information retrieved by the management module will be dependant upon the message sent to it by the Program User. In other words, each option chosen will be associated with a different query of the dispute resolution data stored within the management module and therefore, retrieve different amounts, quantities and types of information.

In the preferred embodiment of the present system as shown in FIG. 3, the Program User Page offers the following selectable options to a Program User.

Add and Negotiate a Dispute

Adding (or submitting) disputes to the system is the primary activity for a Program User. Program Users begin the process of adding a dispute by clicking on the Add Dispute icon 40 from the Program User Page.

Figure 4:
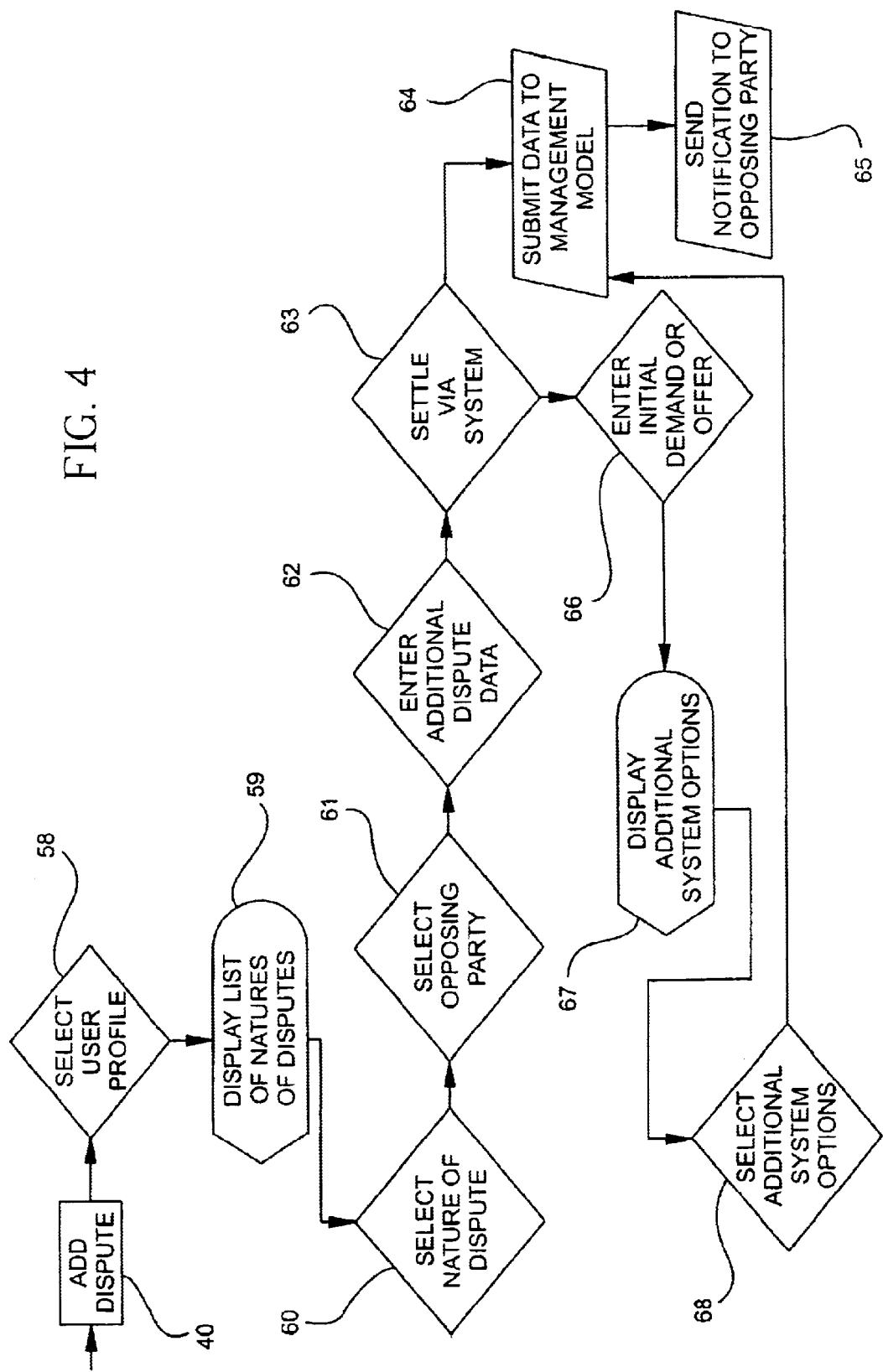
FIG. 4 is a flow chart of the process for adding a dispute, and the data related thereto, into the system of the present invention.

As shown in FIG. 4, after a Program User selects to add a dispute 40, they are then prompted to select a profile classification 58 as either a plaintiff or a defendant.

After selecting the appropriate profile, the user is then prompted to select at 60, from a displayed general list 59, the nature of the dispute. The general nature of the dispute can be a general dispute, a bad loan, a business transaction, construction, contract, credit card, foreclosure, labor and employment, landlord/tenant, lender liability, partnership agreement, personal injury, professional liability, purchase and sale transaction, rental agreement, intellectual property, subrogation, worker compensation, or any other cause of action recognized by a judicial system, whether in the United States or abroad.

Thereafter the Program User is prompted by the system to select an Opposing Party at 61 from a list generated from the data stored in the management module, or a new Opposing Party whose data is not yet entered into the system.

Opposing Parties are those individuals, firms or companies who have accounts with the system or who have been users of the system. The present system is designed such that every time a Program User within a particular account adds a new dispute to the system, data on both the Opposing Party and an individual person representing that Opposing Party is retained within the management module of the system. This retaining of information is done for a number of reasons.

First, if an additional dispute is added to the system for that Opposing Party, the data corresponding to that party or individual will not need to be re-entered, but rather simply selected. This process of retaining the data will save the user time in entering disputes into the system. Further, the retained data is made globally available to all users of the account when entering a new dispute.

In addition, by selecting companies and firms as well as individuals within those companies and firms from a list, reports may be generated based on those Opposing Parties. This is particularly advantageous in determining which Opposing Parties respond to dispute submissions and the analysis of disputes settled with those Opposing Parties.

Next, the Program User is prompted at 62 to enter additional dispute information such as name of case and reference numbers, etc. The type of dispute information requested will depend upon the dispute type selected. For example, if the general nature of the dispute is personal injury, then additional information requested would be information such as injury type, venue, primary body parts injured, etc.

Additionally, for certain types of disputes, computer generated assist displays will be provided. For example, if the general nature of the dispute chosen was personal injury as stated above, then a body parts injured display can be selected by clicking on an icon. This display will assist the users in identifying the body parts injured by displaying a human skeleton from which they may select any number of body parts involved in the dispute.

Next, if the Program User wishes to utilize the dispute resolution capabilities of the present system, they can begin that procedure by selecting to settle via the system at 63, as shown in FIG. 4. The procedure for settling a dispute via the system will be described in greater detail below with reference to the reckoning module directions.

When selecting to utilize the resolution capabilities of the system, the user is prompted at 66 to enter an initial demand if profiled as a plaintiff, or an initial offer if profiled as a defendant.

Next, the system can display at 67, additional system options which can be selected or entered at 68 by the party submitting the dispute. The additional system options which may be selected by the submitted party will be described in greater detail throughout the present specification.

Otherwise, if the Program User submitting the dispute wishes to use the management capabilities of the system to organize the dispute data and submit the same for mediation and/or arbitration, they can simply submit the above-entered information to the management module at 64 for sorting, compiling, organization, storing and notification 65 to the opposing party and appropriate mediation or arbitration personnel.

Whether the Program User submitting the dispute chooses to negotiate the dispute via the system or transmit the entered data for mediation and/or arbitration, after all relevant data corresponding to the dispute is entered, the Program User then submits the data to the management module at 64 for identification, sorting, organizing and storing by clicking on the Submit icon. Before the dispute resolution data is finally submitted, however, the Program User submitting the dispute (whether profiled as a plaintiff or a defendant) is preferably prompted to review all the entered data before it is finally submitted to the management module. By presenting the Program User with this secondary review, the Program User has the opportunity to review the accuracy of the entered data and make any changes which may be required. If all of the information is correct, the Program User then clicks on the Submit icon to finally send the data to the management module of the system. The Program User will then receive an indication that the dispute has been properly saved.

Once a dispute is entered into the system, several actions begin. As seen in FIG. 4, a notice is sent to the opposing party at 65 indicating that a dispute soliciting their response has been entered into the system. The opposing party is contacted by letter, e-mail or any other means available. The opposing party is provided with a user code and dispute code so that they may access the system via the web site. Unless the opposing party responds, additional follow-up notices may be sent.

Optionally, the Program User submitting the dispute into the system may also mark the dispute as a priority. This option invokes additional notification services from the system. The system will normally inform the opposing party of a submitted dispute via regular mail. If a dispute is marked as a priority, administrative personnel for the system will attempt to contact the opposing party directly, in addition to the mailed notice, in order to actively persuade them to activate and engage the dispute.

Additionally, the party submitting the dispute may set the time limit the opposing party has to respond. When a party enters a dispute into the system they can specify the maximum number of days the dispute may be negotiated before the negotiation process is automatically terminated. If the expiration date of the dispute is set to 60 days from the date of entry, the dispute status will be changed to expired if there is no response from the opposing party within 60 days.

Responding to a Dispute

After the opposing party receives notification that a dispute has been entered into the system, they can respond to the submitted dispute in several ways. Before responding, however, the opposing party must have their access code and dispute code. Without these, the opposing party cannot access the system. The opposing party, with access and dispute code in hand, uses the web browser of their computer to locate and retrieve the web site for the present system as described above. After accessing the web site, the responding party is prompted to either utilize the settle-only access (if not already a Program Manager/User of the present system), register a new account with the system and establish themselves as a Program Manager/User, or indicate that they are not interested in utilizing the present system to conduct negotiations of any kind. Each of the aspects to these options will be discussed in greater detail below.

Upon entry of a valid access code and a dispute code, the management module will send all dispute resolution data corresponding to these input codes to the reckoning module for application of the pre-selected criteria. The process of applying the pre-selected criteria will be discussed in greater detail with respect to the reckoning module below.

Further, the responding party (whether plaintiff or defendant) may not agree to utilize the present system to resolve the dispute. If the responding party so desires, they may click on the "Not Interested" icon. If the responding party is not interested, the present system will notify the submitting party via e-mail that the responding party is not interested in negotiating via the system.

Once all parties agree to resolve the dispute via the present system, each may access the dispute at any time to either enter a new demand or offer, or simply to see if your adversary has entered a new demand or offer. Before the demand/offer is submitted to the reckoning module, however, the responding party will be prompted by the system for a final review of the dispute data and demand/offer amount to ensure accuracy. If the data is accurate, the responding party then finally submits the demand/offer. The system will then determine if the dispute is resolved or not resolved based upon the pre-selected criteria within the reckoning module.

The system is designed such that either party does not need to wait until their adversary enters a new demand or offer in order for them to enter additional demands or offers, they can enter as many demands or offers as they deem appropriate.

Forwarding Data for Mediation and/or Arbitration

In addition to, or instead of, utilizing the present system to resolve a dispute via the criteria within the reckoning module, the parties may choose to have the dispute forwarded for mediation or arbitration. If this route is chosen, all information entered into the system will be forwarded to the appropriate personnel by the management module for mediation or arbitration.

If the parties mutually agree to allow their dispute to be decided by mediation or arbitration, all parties would then have an opportunity to submit arguments, information and proof, to a mediator or arbitrator. In accordance with the present invention, such information is preferably submitted to the mediator or arbitrator via a network communication channel, such as wireless communication, the Internet or any suitable equivalent thereof. The mediator or arbitrator would then review the respective positions and issue a decision to both parties.

Further, the mediation and/or arbitration can be a real-time on-line mediation or arbitration, or can be an off-line mediation or arbitration. Preferably, the parties submit arguments, information, proof, and any other evidence to be considered by the mediator or arbitrator via the Internet. The parties may also include offers and demands with the dispute information submitted.

When this process is done in real time, the mediator or arbitrator can request additional information or explanation from a party, should such further information or explanation be required.

A full discussion of all the mediation and arbitration variations is beyond the scope of this application and need not be discussed in detail herein. Important to the present invention is the ability to access the non-judicial "management and procedure" and to move uninterrupted, i.e., seamlessly, from one technique to another using the information previously provided while making a full range of procedures available to the users.

Browsing Program User Disputes

Similar to the Program Managers, Program Users, in addition to adding and negotiating a dispute as described above, may also manage the data entered for a dispute and the new data generated during the dispute process. This feature allows the Program User to browse and sort all disputes that they have submitted or that they are a party. To browse the data, the Program User clicks on the "Browse Disputes" icon 42 on the Program User Page to access the Browse Dispute s List. Preferably, the Browse Disputes List is displayed to the Program User as sorted by Dispute Status. The system, however, can b e con figured to have the list sorted by any desired criteria. To display the dispute list by another category, the Program User can simply click on the Sort By icon. Thereafter, the list can be sorted by any category available, such as dispute; caption, status, claimant, defendant, etc. Additionally, the Program User can sort the list by multiple categories simultaneously, if desired. After choosing the sort order, the list will be sorted and displayed accordingly.

Additionally, the Program User may also click on the "Find Dispute" icon to find a particular dispute. Thereafter, a Find Dispute Form will appear. The Program User then inputs characters in any or all of the fields in the Find Dispute Form so that the system can locate the dispute. The fields displayed for searching are, for example, dispute, caption, claimant, defendant, etc. By clicking on the "Submit" icon within the form, the system is prompted to search for any matching disputes and display only those disputes which match the entered characters.

Further, at any time the Browse Dispute List is displayed, detailed data on any particular dispute may be displayed by clicking on that particular dispute.

Generating Detailed Dispute Reports

Program Users can also create a viewable and printable detailed dispute report on all disputes that they have entered or that they are a party. Clicking on the "Reports" icon 44 causes the Report Form to be displayed. By selecting various criteria and sort orders, virtually any variation of a report may be generated.

The criteria used to generate the dispute reports may include, but is not limited to, the following: all opposing parties/one particular opposing party, all dispute types lone particular dispute type, all venues/one particular venue, all injury types/one particular injury type, all primary body parts injured/one particular primary body part injured, all disputes/only active disputes, etc.

Further, the sort order may be arranged in any desired manner, such as, for example, claim; status; dispute type; opposing party/claim; opposing party/status; and opposing party/dispute type. The system, however, enables the requested information to be arranged in any desired order. After the Report is generated, the Program User can print the Report.

Generating Summary Dispute Reports

Program Users may further elect to create viewable and printable summary reports on all disputes which they have submitted or in which they are a party. Clicking on the Summaries icon 43 causes the Summary Report Menu to be displayed.

The Program User may elect to view summary statistics sorted, subtotaled and totaled by any of the following qualifying criteria, including, but not limited to: dispute type, primary injury, primary body part injured, venue, opposing party, or any other qualifying criteria within the system. The Program User may also elect to view summary statistics based on any combination of the following quantifying criteria, including but not limited to: number of disputes, number of disputes activated, number of disputes engaged, number of disputes settled, percentage of disputes settled, total monetary value of disputes settled, average monetary value of disputes settled, or any other quantifying criteria within the system.

Analyzing Hearing Officers for Mediation(s) and/or Arbitration(s)

The Program User may select to analyze settlement data for all mediation and/or arbitration cases for a particular Hearing Officer. The data analyzed may include settlement amounts, award data, case status, case type, etc. This will allow program users to analyze the performance of particular Hearing Officers with respect to particular case types.

Sending an E-Mail

The Program User may click on the E-Mail icon 45 from the Program User Page at any time to send an E-Mail to the system administrative department. When the E-Mail icon is selected, the system will automatically set the "Send To" field in users E-Mail program to the assigned e-mail address for the system administrative department.

Logging Off

The Program User may also choose to "Log Off" the system from the Program User Page. To do this, the Program User simply clicks on the Log Off icon 46.

Preferably, the present system is designed to automatically log off any Program User who has not clicked the mouse or pressed any key on the keyboard for a pre-set period of time, most preferably 30 minutes. This automatic log off is set-up in order to free resources to other Program Users (or Program Managers) who may be actively using the system. When automatically logged-off, all Program Users simply need to log-in again in order to continue working with the system.

Administrative Access

Due to the nature of the present system, there is an Administrative Personnel Access Function. When granted access as an administrative personnel, the user is presented with a plurality of selectable choices 47. Administrative Personnel Access and the selectable choices are shown in FIG. 3, and include informing opposing parties of disputes submitted to the system which request their response 52, informing parties of settled disputes 53, generate activity reports 49, generating priority dispute lists 54, marking disputes active 51, providing billing information to the system billing department 55, generating Account Summary Reports 50 and generating Audit Reports 56 to ensure that the system is functioning properly, or any combination of these choices.

These functions are performed by system personnel by logging onto a web site designated to allow performance of the systems administrative functions. Once properly logged on, these choices appear.

Where appropriate, administrative personnel can select to view the records within a specified data range. When selecting Activity Report 49, for example, a Date Range Form appears. After entering valid Date Range values, and clicking on the Submit icon within the screen, a Report will be generated to the screen listing, on separate pages, a list of new disputes submitted within the date range with all data necessary to inform opposing parties of those disputes, a list of all disputes settled within the date range with all data necessary to inform parties of those disputes settled, a list of new disputes submitted which are marked as priority within the date range with all data necessary to inform opposing parties of those disputes on a prioritized basis, a list of disputes to be forwarded for mediation or arbitration that have either not settled or expired within the date range which were marked for forwarding for mediation or arbitration, and a list of amounts to be billed, along with all information on parties to be billed for disputes that have either settled, did not settle, or expired within the date range.

When selecting Summary Statistics 50, for example, the Date Range Form also appears. After entering valid date range values, and clicking on the Submit icon within the screen, a report will be generated to the screen listing, on separate pages, summary reports indicating settlement statistics for all accounts & disputes.

Typically, the dispute details will be absent from the summary reports because this report is used mainly for ensuring that disputes are settled properly from a technical perspective.

When selecting Activate Dispute 51, an Activate Dispute Form appears. After entering a valid dispute identification and clicking on the Submit icon within the screen, an Activate Dispute Confirmation Screen will appear. Upon clicking the Submit icon within the Form, the dispute will then be marked ACTIVE in the system and, if applicable, the expiration date of the dispute will be set to 60 days from the activation date.

Settle Only Access

If the opposing party is not registered and only wishes to settle the dispute with the present system, they simply enter both the access and dispute codes for the particular dispute they wish to negotiate and select "settle-only" access.

As can be seen in FIG. 3, upon entry of a valid access code, dispute code and selection of "settle-only" access, the responding party will be given access to the system for purposes of settlement only and will not be given access to the management capabilities of the system. All information input by the responding party, however, will be routed through the management module for organizing, sorting, compiling and storing for use by the submitting party, and possible use by the responding party should they decide to register with the system at a later date.

Thereafter, the management module will send all dispute resolution data corresponding to the input access and dispute codes to the reckoning module. Since a responding party choosing to utilize the settle-only access will not be given access to any of the management module capabilities, the system will display only the relevant dispute resolution data to the settle only access user. This display will notify the settle only access user of the present status of the dispute, any recent activity, etc. For example, if the dispute has already expired or has been settled or did not settle, the settle only access user will be notified of the same by the system. Additionally, the system will list any dates and amounts of demands/offers entered for the dispute, if any, and the settlement date and amount in the event the dispute was resolved. If the dispute has been resolved or has expired, no further demands/offers will be allowed to be placed.

As opposed to merely attempting to settle the dispute via the system, a settle only access user responding to a submitted dispute may choose to register a new account with the present system. The various benefits of registering an account are that the responding party will be given the ability to perform detailed and summary reporting, the ability to manage multiple disputes from a single account without having to enter an access code and dispute code for each separate dispute (aside from the initial retrieval of a newly entered dispute to which they received notification), and the ability to actually submit disputes onto the system.

As stated above, all information and data entered into and generated by the reckoning module by a settle only access user is transmitted to the management module for identification, sorting, compiling and storage.

Reckoning Module

Returning to FIG. 2., and as stated above, the architecture 3 of the present system also includes a reckoning module 6 connected to the management module 5 for receipt of the non-judicial dispute resolution data in response to a request for implementing a dispute resolution procedure via the system. The reckoning module 6 utilizes pre-selected criteria and applies that criteria to the input dispute resolution data to effectuate a resolution of the dispute, and thereafter transmits any new data generated during the resolution procedure to the management module 5 for sorting, compiling, and retrievable storage with related data stored therein.

In response to the input of a valid access code and dispute code, the management module sends all dispute resolution data corresponding to the input access and dispute codes to the reckoning module. The system will display all relevant information regarding the dispute to the parties. For example, the display will notify the parties of the present status of the dispute, any recent activity, etc. For example, if the dispute has already expired or has been settled or did not settle, the parties will be notified of the same by the system.

Additionally, the system will list any dates and amounts of demands/offers entered for the dispute, if any, and the settlement date and amount in the event the dispute was resolved. If the dispute has been resolved or has expired, no further demands/offers will be allowed to be placed.

If the dispute has not yet been resolved or has not expired, the parties will be prompted to place a demand/offer (depending upon their profile as either a plaintiff or a defendant). If no previous demand/offer had been placed on the dispute, the parties will be asked to enter their initial demand/offer. If an initial demand/offer has already been placed for the dispute, the parties will be prompted to enter a subsequent demand/offer. This process will continue until the dispute is resolved according to the pre-selected criteria within the reckoning module or the time limit for resolving the dispute expires.

Once a demand and an offer (depending upon whether the responding party is a plaintiff or a defendant) has been entered for a submitted dispute, the system then applies the pre-selected criteria within the reckoning module.

Further, each time a party enters a demand or offer into the system, the status of the dispute will be changed accordingly. The system employs a method for notifying the user of the status of the dispute by organizing the disputes entered into the system into certain color-coded categories. For example, those disputes highlighted in yellow indicate that the user was the last person to enter a demand or offer and that the dispute will expire within ten (10) days if not settlement is reached; disputes listed in red indicate that the opposing party was the last party to enter a demand or offer into the system and that the dispute expires within ten (10) days if no settlement is reached; and disputes listed in blue indicate to the user that the opposing party was the last party to enter a demand or offer into the system, but that the dispute will not expire within ten (10) days.

The reckoning module of the present system may invoke any number of pre-selected criteria to resolve a dispute. Preferably, the system is setup to utilize bid-style negotiations, or, as stated above, simply forward the input dispute resolution data to an appropriate third party for mediation or arbitration.

Bid-style negotiations can take place either "closed" or "open". Closed bids are not made known to the opposing party(ies), while "open" bids are made known to the opposing party(ies). Each of the scenarios set forth herein can be made to apply in an "open" or "closed" condition.

During closed negotiations, the parties are not able to view the other party's demands or offers. The parties only see the resolution amount if and when the dispute is resolved. This option is particularly useful so as to not give away your position to your adversary.

During open-bid negotiations, one party will be able to view the other party's demand or offer, but only after they first enter a demand or an offer. For example, if the defendant submits the dispute and enters an initial offer, the system will not disclose the defendant's offer to the plaintiff until the plaintiff enters an initial demand. If the dispute is resolved, the parties will be informed of the resolution amount. If the dispute is not resolved, the parties will be so advised. Thereafter, the defendant will not learn the amount of the plaintiffs initial demand until he or she enters another offer. Negotiations can continue until the dispute is resolved or until one party decides they are no longer interested in learning how much the other party has demanded or offered.

The details of how the reckoning module of the system can resolve a dispute are as follows.

Bid-Style Negotiations

The system can effectuate a settlement via bid-style negotiations, then, after the dispute resolution data is forwarded to the reckoning module, the reckoning module may compare the input demand to the input offer as follows:

if $Y \leq X$, then the dispute will settle for Y;

if $Y > X$ and $Y \leq (X+30\%)$, then the dispute will settle for $(X+Y)/2$;

if $Y > (X+30\%)$, then the dispute will not settle;

wherein:

X=the defendant's offer, and

Y=the plaintiff's demand.

In other words, for the above example, the dispute will (1) settle for the value of the plaintiff's demand if the plaintiff's demand is below the value of the defendant's offer; (2) settle for the average between the plaintiff's demand and the defendant's offer if the plaintiff's demand is within 30% of the defendant's offer; or (3) not settle if the plaintiff's demand is above 30% of the defendant's offer.

The above algorithm can be varied by changing the percentage applied to the defendant's offer. Preferably, the percentage applied to the defendant's offer is from about 5% to about 35%. Additionally, the percentage applied to the defendant's offer can be set by the Program User, typically the defendant, or preferably set as a default percentage by the system.

Further, the above bid-style negotiation may be repeated an unlimited number of times. That is, the plaintiff and the defendant may continue to negotiate until the dispute is resolved or negotiations are terminated. When repeated, the above algorithm is applied to the plaintiff's last entered demand and the defendant's last entered offer. Take the following situations for example:

EXAMPLE 1

EXAMPLE 1

| Date | Who | Action | Amount | Result |
|------|-----|--------|--------|--------|
| 01/18 | Plaintiff | Initial Demand | $20,000 | n/a |
| 01/25 | Defendant | Initial Offer | $10,000 | Did Not Settle |
| 01/28 | Plaintiff | New Demand | $18,000 | Did Not Settle |
| 02/05 | Defendant | New Offer | $15,000 | Settled for $16,500 |

In Example 1, the dispute settled because the last demand ($18,000) was within 30% of the last offer ($15,000). It settled for $16,500, the average of the last offer ($15,000) and the last demand ($18,000).

EXAMPLE 2

EXAMPLE 2

| Date | Who | Action | Amount | Result |
|------|-----|--------|--------|--------|
| 03/05 | Plaintiff | Initial Demand | $12,000 | n/a |
| 03/18 | Defendant | Initial Offer | $8,000 | Did Not Settle |
| 03/27 | Plaintiff | New Demand | $8,500 | Did Not Settle |
| 04/05 | Defendant | New Offer | $9,000 | Settled for $8,500 |

In Example 2 above, the dispute settled because the last demand ($8,500) was below te last offer ($9,000). It settled for $8,500, the amount of the last demand.

EXAMPLE 3

EXAMPLE 3

| Date | Who | Action | Amount | Result |
|------|-----|--------|--------|--------|
| 02/05 | Plaintiff | Initial Demand | $80,000 | n/a |
| 02/10 | Defendant | Initial Offer | $40,000 | Did Not Settle |
| 02/20 | Plaintiff | New Demand | $75,000 | Did Not Settle |
| 02/25 | Plaintiff | New Demand | $70,000 | Did Not Settle |
| 03/01 | Defendant | New Offer | $50,000 | Did Not Settle |
| 03/05 | Defendant | New Offer | $60,000 | Settled for $65,000 |

In Example 3, the dispute settled because the last demand ($70,000) was within 30% of the last offer ($60,000). It settled for $65,000, the average of the last offer ($60,000) and the last demand ($70,000). Please note that Example 3 above illustrates that either a plaintiff or a defendant may enter a demand or an offer at anytime they wish and they do not have to wait until the opposing party responds. When a party enters consecutive offers or demands, the system will utilize the last entered offer or demand for comparison.

Further, bid-style negotiations can be setup to resolve a dispute by prompting the user to input either an initial demand (for a user profiled as a plaintiff) or a high value and a low value to establish a resolution range (for a user profiled as a defendant). These input amounts will be used by the system to calculate whether the dispute is resolved.

When using the above resolution range embodiment, the dispute will (1) settle for the amount of the plaintiff's demand if the demand is between the high value and the low value of the defendant's resolution range; (2) settle for the low value of the defendant's resolution range if the plaintiff's demand is less than or equal to the low value of the resolution range; or (3) not settle if the plaintiff's demand if above the high value of the defendant's resolution range.

This embodiment can also be repeated an unlimited number of times. That is, the plaintiff and the defendant may continue to negotiate until the dispute is resolved or negotiations are terminated by either party. When repeated, the defendant enters a high value and a low value for each repetition and the plaintiff enters a demand for each repetition.

Alternatively, the system can be setup to automatically calculate a defendant's resolution range from a single entered value for each round. The system can either use the entered value as a median value, low value or high value and apply an appropriate percentage to that value to arrive at a resolution range.

Additionally, the system can be setup to keep the low value of the resolution range at a fixed value. For example, when the defendant enters an initial offer, the low value of the resolution range will be set to 50% less than the initial offer entered, and the high end will be set to the initial offer. During subsequent repetitions, the low value of the range will not change and will be set to the value previously calculated, however, the high end will be changed to the offer entered for that repetition.

For example, if the defendant entered $10,000 as an initial offer, the system would calculate the resolution range as $5,000 to $10,000. The low end of the range will remain the same for each subsequent repetition ($5,000) and the high end of the range will be established as the subsequent offer entered.

Further, the user may choose an auto-negotiate option. If the auto-negotiate option is chosen, the system will calculate the demands/offers entered for each round based upon certain criteria. When the user selects the auto-negotiate option, the system will prompt the user to input certain criteria which will enable the system to make a decision as to the demands/offers to be made. The criteria prompted to be entered may include the following: i) the number of offers/demands the user would like to make, ii) the consideration they would like to increase or decrease with each successive repetition of negotiations, iii) the time period they would like between the submission of demands/offers, and any other similar criteria. This option may be selected by the defendant, plaintiff, both or neither.

For example, if the defendant selects the auto-negotiate option, then the defendant would be prompted to enter additional information which they would like the system to consider when making offers. The defendant could enter a single offer and an amount with which to increase that offer for each repetition. This option could also be used in conjunction with the different pre-selected criteria used to effectuate a settlement as discussed above.

Optionally, the system may also employ the use of a "silent mediator" feature, electronic or otherwise. This feature operates in the last repetition of negotiations if there was a set limit to the number of repetitions, or to demands/offers identified as final demands/offers. With the "silent mediator" feature, the dispute will settle for the average of the demand and the high value of the resolution range if the demand is within a specified percentage of the high value of the resolution range. In other words, the dispute will only not settle if the demand is higher than the high value of the resolution range for any repetition other than the most recent, and above the high value of the most recent established resolution range plus the specified percentage. With this feature, the system assumes that the parties would truly wish to resolve the dispute if they knew they were within the specified percentage of each other at the end of the negotiation process.

The specified percentage is preferably from about 5% to about 30%. Additionally, the specified percentage may be set by the system or chosen by one or more of the parties to the dispute.

If, after application of any of the above criteria, the dispute does not settle, the party entering the demand/offer will be informed of such and prompted to either enter another demand/offer (if the demand/offer entered was not a final or last repetition demand/offer), or log-off the system. Should the user opt to enter another demand/offer they may do so and the process as outlined above will be repeated. If the user wishes to log-off the system they will be returned to the home page of the web site.

Preferably, and to facilitate resolution of the dispute, the system may require that parties profiled as defendants increase offers for each repetition of negotiations by a minimum of a predetermined percentage, such as 5% of the prior offer. Similarly, the system may require that parties profiled as plaintiffs decrease their demands by a minimum of a predetermined percentage, such as 5% of the prior demand. In other words, if you are the plaintiff, and your last demand was $100,000, your next demand may be required to be $95,000 or less ($100,000−5% is $95,000). Similarly, if you are the defendant and your last offer was $90,000, your next offer may be required to be $94,500 or higher ($90,000+5% is $94,500).

Further, the system preferably applies a fee structure for accessing and using the system. While any fee structure can be provided for accessing and using the present invention, a preferred embodiment contemplates a fee structure which financially encourages each of the parties to resolve the dispute. One such structure requires each party to pay a certain amount to participate in the resolution proceeding(s). Thus, the plaintiff must pay a fee for submission of each demand and the defendant must pay a fee for submission of each offer. These fees can also be graduated to correspond to the financial magnitude of the dispute, e.g., a "dog bite" case to a serious injury or even a death case. A variety of schemes can be employed, but this feature of the invention financially rewards resolution and financially penalizes non-resolution by fee structure.

Further, before either the defendant or the plaintiff enters an offer or a demand into the system, they are preferably prompted to review a Negotiation Agreement. If they agree to the terms of the Agreement, they then click on the Agree icon and are thereafter bound by the terms and conditions of the Agreement. If this option is utilized, and the parties do not agree to the terms and conditions, they are not allowed to enter demands or offers onto the system. This review of a Negotiation Agreement is preferably prompted to every party before the entering of demands or offers.

The parties to the dispute may also have the option of entering a maximum settlement amount (for defendants) or a minimum settlement amount (for plaintiffs). If a maximum settlement amount is entered, the system will prohibit a defendant from entering a settlement offer that may result in a settlement that exceeds the selected maximum amount. Conversely, if a minimum settlement amount is entered, the system will prohibit the plaintiff from demanding an amount that may result in a settlement that is less than the selected minimum amount. If a user enters a prohibited amount, the system will reject the amount and request the user to enter an appropriate value or amend their maximum or minimum settlement amount.

The system may also utilize a negotiating safeguard. Specifically, after a user enters an offer or a demand, the system will prompt the user inquiring as to whether or not the user wishes to enter that particular amount, further modify the amount, or not enter the amount at all. This safeguard further ensures that either party has a sufficient time to contemplate and/or modify their demand or offer before entry, thereby decreasing the possibility of erroneous entry.

The parties to the dispute may also be given the option of entering a "final demand" (plaintiff) or "final offer" (defendant) at one time during the negotiation process. This is accomplished by clicking on the "final demand" or "final offer" icon on the bid submission screen.

If the defendant selects the "final offer" option, the system will automatically calculate the exact amount the defendant can offer so that the maximum settlement amount possible on the dispute (calculated in accordance with the systems settlement criteria) will be equal to the maximum possible settlement amount.

If the claimant selects the "final demand" option, the system will automatically calculate the exact amount the claimant can enter so that the minimum settlement amount possible on the dispute (calculated in accordance with the systems settlement criteria) will be equal to the minimum possible settlement amount.

Once a party (plaintiff or defendant) has selected the "final demand" or "final offer" option, they are prevented from entering any further offers or demands for the dispute. In addition, the dispute status will be changed to "final offer" or "final demand" and the other party will be notified of the change.

After all information is entered into the system in an attempt to resolve the dispute, the information entered and generated by the reckoning module is transmitted to the management module for identification, sorting, compiling and storage.

Claims-data Storage and Retrieval System

Further, Program Managers of the present system will be given the option of utilizing a claims-data storage and retrieval system. If a user chooses to use the storage and retrieval system, the data for all of the disputes for that particular user will be forwarded by the management module to a claims-data storage and retrieval system 20, as shown in FIG. 2. The claims-data storage and retrieval system will further sort, compile, arrange and store the forwarded data with the data from all other data in the system in a queryable form. Thereafter, all users who have forwarded data will have access to the claims-data storage and retrieval system via the management module 5 of the system 1. All users who have forwarded data will be able to enter a query to the management module for a search of the storage and retrieval system.

For example, in personal injury cases, users of the storage and retrieval system can query the storage and retrieval system data to ascertain the average settlement values for all disputes entered into the system based on venue, type of injury and/or body part injured. To keep certain information confidential, the users will not have access to specific dispute information, such as the parties' names, attorneys' names or claim or dispute numbers.

The forwarding of data to this storage and retrieval system will enable the users of the present system to better determine a fair value for a claim based on current and past statistical data. This feature will lead to a more efficient negotiation process wherein defendants will be able to quickly and easily ascertain the value of certain claims.

Software Packages

Preferably, the present invention is designed for use with the following software packages, or their equivalent: Microsoft Windows NT Server 4.0 with Internet Information Server 3.0 (IIS), Allaire ColdFusion 4.0 Server and Studio, Microsoft Visual Foxpro 6.0 (alternatively, Microsoft SQL Server 7.0 Enterprise), Seagate Crystal Reports, Expert Systems Ease Telephony System, and the like. A full discussion of these and other related software packages is beyond the scope of this application. However, brief explanations as to how the above-mentioned packages are utilized by the present system are noted below.

The Microsoft Windows NT Server 4.0 with Internet Information Server 3.0 (IIS 3.0) allows the server to operate and involves setting user access rights and monitoring system performance. IIS 3.0 allows for the web hosting features related to Windows NT and allows internet users to access the present system.

Allaire ColdFusion 4.0 Server and Studio software is a web hosting program which complements IIS 3.0. It specializes in handling the management module features of the present system, such as, for example, adding, updating, deleting and retrieving data in the management module. Coldfusion processes requests from the system and translates them into instructions that IIS 3.0 can understand. IIS 3.0 processes those instructions and returns the results back to Coldfusion.

Microsoft Visual Foxpro 6.0 (alternatively, Microsoft SQL Server 7.0 Enterprise) is a relational database management system. This, and other similar software, stores all data for to the system. IIS 3.0 and Coldfusion communicate with this software via the Open Database Conductivity (ODBC) services feature offered in Windows NT.

Seagate Crystal Reports is a database report generating software package. This software outputs information to HTML format files utilized during communication with the internet. This software works in tandem with the ODBC feature of Windows NT.

Expert Systems Ease Telephony System is a telephony platform as well as a development system. This package allows for the routing of incoming calls to the system and also communicates with the data files via the ODBC feature of Windows NT.

The ability of the system of the present invention to manage and compile all information related to the dispute enables the substantially seamless progression from bid-style negotiations to mediation to arbitration. Additionally, the sorting, compiling, organizing and storage capabilities of the present system allow the parties to choose between some or all of the above-outlined resolution procedures, and in any order they desire.

Thus, while the foregoing detailed description has disclosed what is presently believed to be the preferred embodiments of the invention, those skilled in the art will appreciate that other and further changes and modifications can be made without departing from the scope or spirit of the invention, and it is intended that all such other changes and modifications are included in and are within the scope of the invention as described in the appended claims.

What is claimed is:

1. A system for managing non-judicial dispute resolution comprising:
    an electronic architecture which receives, sorts, and stores data related to non-judicial dispute resolution for implementation and management of a full range of non-judicial dispute resolution procedures between two or more adverse parties to a dispute, said architecture comprising:
    a management module configured to receive, sort and store said dispute resolution data and to provide an internal continuous compilation of said old data and new data generated during said non-judicial dispute resolution procedures; and
    a reckoning module connected to said management module for receipt of said dispute resolution data, said reckoning module designed to implement a selected resolution procedure and to transmit to said management module new data generated during said resolution procedure.

2. A system as described in claim 1 wherein said system is accessible via the Internet.

3. A system as described in claim 2 wherein said system is accessed via a link embedded within a web site of another entity.

4. A system as described in claim 1 wherein said system is accessible via electronic communication.

5. A system as described in claim 1 wherein said system is accessible via wireless communication.

6. A system as described in claim 5 wherein said wireless communication is selected from the group consisting of radio frequency, microwave, UHF and other frequencies selected from the electromagnetic spectrum.

7. A system as described in claim 1 wherein said system provides access in response to biographical data input by at least one of said parties to said dispute.

8. A system as described in claim 7 wherein said access is provided upon verification of said biographical data.

9. A system as described in claim 8 wherein said biographical data comprises at least one or more of an account number, username, and password.

10. A system as described in claim 7 wherein said access is a tiered level access comprising at least a program manager access and a program user access.

11. A system as described in claim 10 wherein program manager access includes a plurality of selectable actions.

12. A system as described in claim 11 wherein said plurality of selectable actions is selected from the group consisting of adding additional users, modifying existing user data, transferring active cases from one user to another user, deactivating users, modifying account registration data, browsing all disputes, generating detailed dispute reports, generating summary reports of all disputes, browsing all dispute resolution cases, and any combination of one or more of said actions.

13. A system as described in claim 12 wherein said management module provides relevant data to said program manager in response to an action selected by said program manager.

14. A system as described in claim 10 wherein said program user access includes a plurality of selectable options.

15. A system as described in claim 14 wherein said plurality of selectable options is selected from the group consisting of adding a dispute, responding to a dispute, browsing disputes, generating dispute reports, and generating summary reports, and any combination of one or more of said options.

16. A system as described in claim 15 wherein said management module provides relevant data to said program user in response to an option selected by said program user.

17. A system as described in claim 7 further comprising administrative personnel access.

18. A system as described in claim 17 wherein said administrative personnel access includes a plurality of selectable choices.

19. A system as described in claim 18 wherein said plurality of selectable choices is selected from the group consisting of informing parties of disputes submitted to the system which request their response, informing users of settled disputes, marking disputes active, generating priority dispute lists, generating activity reports for the system, providing billing information, generating summary reports for any or all accounts within the system, generating audit reports to ensure that the system is functioning properly, and any combination of one or more of said choices.

20. A system as described in claim 19 wherein said management module provides relevant data to said administrative personnel in response to a choice selected by said administrative personnel.

21. A system as described in claim 7 further comprising settle-only access.

22. A system as described in claim 21 wherein said management module provides relevant data to said reckoning module in response to providing settle-only access.

23. A system as described in claim 22 wherein said system displays only said relevant data to said settle-only access user.

24. A system as described in claim 1 wherein said management module further provides operational support to be used in connection with said non-judicial dispute resolution procedures.

25. A system described in claim 24 wherein said operational support is selected from the group consisting of reporting services, translation services, interpretation services, structure settlement arrangements, and any combination of one or more of said operation supports.

26. A system as described in claim 1 wherein said architecture further comprises a claims-data storage and retrieval system.

27. A system as described in claim 26 wherein said storage and retrieval system retains data relating to dispute resolution and enables retrieval of said data by categories.

28. A system as described in claim 27 wherein said categories are selected from the group consisting of descriptive nature of the dispute, settlement amount, venue, type of injury, body part injured, sex, age, occupation, and any combination of one or more of said categories.

29. A system as described in claim 26 wherein said storage and retrieval system is accessed by a user who agrees to provide data from said management module which relate to all disputes associated with said user.

30. A system as described in claim 29 wherein said storage and retrieval system data is confidential.

31. A system as described in claim 1 wherein said full range of non-judicial dispute resolution procedures comprise bid-style negotiations, mediation, and arbitration, which are provided as a substantially seamless array of procedures.

32. A system as described in claim 31 wherein said management module provides relevant data to said reckoning module in response to a dispute resolution procedure selected by one of said parties to said dispute.

33. A system as described in claim 32 wherein said non-judicial dispute resolution procedure is a bid-style negotiation.

34. A system as described in claim 33 wherein said bid-style negotiation is a closed-bid negotiation.

35. A system as described in claim 33 wherein said bid-style negotiation is an open-bid negotiation.

36. A system as described in claim 33 wherein said system provides a profile promptor to said party selecting said dispute resolution procedure, said profile promptor prompting said party to select a profile.

37. A system as described in claim 36 wherein said profile is selected from the group consisting of plaintiff and defendant.

38. A system as described in claim 37 wherein said system provides a negotiating promptor to said plaintiff and said defendant, said negotiating promptor prompting said plaintiff to enter a demand and said defendant to enter an offer.

39. A system as described in claim 38 wherein said reckoning module employs a pre-selected criteria, said pre-selected criteria comparing said entered demand and said entered offer to determine if said dispute is resolved.

40. A system as described in claim 39 wherein said system sends a notification to said plaintiff and said defendant if said dispute is resolved.

41. A system as described in claim 39 wherein said pre-selected criteria resolves said dispute:
  a) for the value of said demand if said demand is less than said offer; or
  b) for the average between said demand and said offer if said demand is within a pre-selected percentage of said offer.

42. A system as described in claim 41 wherein said pre-selected percentage is from about 5% to about 35%.

43. A system as described in claim 39 wherein said offer includes a high value and a low value, said high value and said low value establishing a resolution range.

44. A system as described in claim 43 wherein said pre-selected criteria resolves said dispute:
  a) for the value of said demand if said demand is between said high value and said low value of said resolution range; or
  b) for said value of said low value of said resolution range if said demand is less than or equal to said low value.

45. A system as described in claim 44 wherein said low value is a fixed value and said high value is a changing value.

46. A system as described in claim 39 wherein said reckoning module transmits said new data generated during said resolution procedure to said management module for compiling, sorting and storing.

47. A system as described in claim 31 wherein said non-judicial dispute resolution procedure is a mediation.

48. A system as described in claim 47 wherein said management module provides relevant data to a mediator in response to said mediation selection.

49. A system as described in claim 48 wherein said mediation is a real-time on-line mediation.

50. A system as described in claim 48 wherein said mediation is an off-line mediation.

51. A system as described in claim 31 wherein said non-judicial dispute resolution procedure is an arbitration.

52. A system as described in claim 51 wherein said management module provides relevant data to an arbitrator in response to said arbitration selection.

53. A system as described in claim 52 wherein said arbitration is a real-time on-line arbitration.

54. A system as described in claim 52 wherein said arbitration is an off-line arbitration.

55. A system as described in claim 1 wherein said system further comprises:
  a fee structure for accessing and using said system.

56. A system as described in claim 55 wherein said fee structure financially rewards resolution and financially penalizes non-resolution.

57. A system for managing non-judicial dispute resolution comprising:
  an electronic architecture which receives, sorts, and stores data related to non-judicial dispute resolution for implementation and management of a full range of non-judicial dispute resolution procedures, said architecture having multiple types of access and further comprising:
    a management module configured to receive, sort and store said dispute resolution data and to provide an internal continuous compilation of said data and new data generated during said non-judicial dispute resolution procedures; and
    a reckoning module connected to said management module for receipt of said dispute resolution data, said reckoning module designed to implement a selected resolution procedure and to transmit to said management module new data generated during said resolution procedure.

58. A system as described in claim 57 wherein said multiple types of access are chosen from the group consisting of program manager access and program user access.

59. A system as described in claim 58 further comprising administrative personnel access.

60. A system as described in claim 59 further comprising settle-only access.

61. An electronic architecture for managing non-judicial dispute resolution comprising:
  a management module configured to receive, sort and store dispute resolution data and to provide an internal continuous compilation of said data;

a reckoning module connected to said management module for receipt of said dispute resolution data, said reckoning module designed to utilize said received data, implement a non-judicial dispute resolution procedure and transmit to said management module new data, if any, generated during said resolution procedure; and wherein said management module, in response to said transmitted new data, groups, sorts and stores said-new data.

62. A system for managing non-judicial dispute-resolution comprising:
an electronic interface, said interface providing multiple types of access to an electronic architecture which receives, sorts, and stores data related to non-judicial dispute resolution for implementation and management of a full range of non-judicial dispute resolution procedures, said architecture comprising:
a management module configured to receive, sort and store said dispute resolution data and to provide an internal continuous compilation of said data and new data generated during said non-judicial dispute resolution procedures; and
a reckoning module connected to said management module for receipt of said dispute resolution data, said reckoning module designed to implement a selected resolution procedure and to transmit to said management module new data generated during said resolution procedure.

63. A system as described in claim 62 wherein said multiple types of access are chosen from the group consisting of program manager access and program user access.

64. A system as described in claim 63 further comprising administrative personnel access.

65. A system as described in claim 63 further comprising settle-only access.

66. A method of managing non-judicial dispute resolution comprising:
providing an accessible architecture which stores non-judicial dispute resolution data and allows said data to be retrieved;
receiving non-judicial dispute resolution data from one or more adverse parties to a dispute;
storing said received data in said architecture; and
prompting said parties to implement a full range of a non-judicial dispute resolution procedures;
wherein said architecture is a tiered level accessible architecture, said tiered level accessible architecture having at least a program manager access and a program user access.

67. A method as described in claim 66 comprising program manager accessing.

68. A method as described in claim 67 further comprising prompting said program manager to select from a plurality of selectable actions.

69. A method as described in claim 68 wherein said plurality of selectable actions is selected from the group consisting of adding additional users, modifying existing user data, transferring active cases from one user to another user, deactivating users, modifying account registration data, browsing all disputes, generating detailed dispute reports for one or more disputes, generating summary reports of all disputes, browsing all dispute resolution cases, and any combination of one or more of said actions.

70. A method as described in claim 69 wherein said program manager selects an action whereby relevant data is retrieved from said architecture.

71. A method as described in claim 66 comprising program user accessing.

72. A method as described in claim 71 further comprising prompting said program user to select from a plurality of selectable options.

73. A method as described in claim 72 wherein said plurality of selectable options is selected from the group consisting of adding a dispute, responding to a dispute, browsing all disputes, generating dispute reports for all disputes, generating summary reports for all disputes, and any combination of one or more of said options.

74. A method as described in claim 73 wherein said user selects an option whereby relevant data is retrieved from said architecture.

75. A method as described in claim 66 further comprising administrative personnel accessing.

76. A method as described in claim 75 further comprising prompting said administrative personnel to select from a plurality of selectable choices.

77. A method as described in claim 76 wherein said plurality of selectable choices are selected from the group consisting of informing parties of disputes submitted to the system which request their response, informing users of settled disputes, marking disputes active, generating priority dispute lists, generating activity reports for the system, providing billing information, generating summary reports for any or all accounts within the system, generating audit reports to ensure that the system is functioning properly, and any combination of one or more of said choices.

78. A method as described in claim 77 wherein said administrative personnel select a choice whereby relevant data is retrieved from said architecture.

79. A method as described in claim 66 further comprising settle-only access.

80. A method as described in claim 66 further comprising:
providing operational support to be used in connection with said non-judicial dispute resolution procedures.

81. A method as described in claim 80 wherein said operational support is selected from the group consisting of reporting services, translation services, interpretation services, structure settlement arrangements, and any combination of one or more of said operational supports.

82. A method as described in claim 66 further comprising:
providing a claims-data storage and retrieval system.

83. A method as described in claim 82 wherein said storage and retrieval system retains data relating to dispute resolution and enables retrieval of said data by categories.

84. A method as described in claim 82 wherein said categories are selected from the group consisting of descriptive nature of the dispute, settlement amount, venue, type of injury, body part injured, sex, age, occupation, and any combination of one or more of said categories.

85. A method as described in claim 82 further comprising providing access to said storage and retrieval system after selecting to forward data relating to all disputes to said storage and retrieval system.

86. A method as described in claim 85 further comprising maintaining storage and retrieval system data as confidential.

87. A method as described in claim 66
wherein said full range of non-judicial dispute resolution procedures comprise bid-style negotiations, mediation, and arbitration, which are provided as a substantially seamless array of procedures.

88. A method as described in claim 87 further comprising implementing a bid-style negotiation.

89. A method as described in claim 88 wherein said bid-style negotiation is a closed-bid negotiation.

90. A method as described in claim 88 wherein said bid-style negotiation is an open-bid negotiation.

91. A method as described in claim 88 further comprising prompting one or more of said parties to said dispute to select a profile.

92. A method as described in claim 91 wherein said profile is selected from the group consisting of plaintiff and defendant.

93. A method as described in claim 91 further comprising prompting one or more of said parties to said dispute to select a nature of said dispute.

94. A method as described in claim 93 wherein said nature of said dispute is selected from the group consisting of loans, business transactions, construction, contracts, credit cards, foreclosures, labor and employment, landlord/tenant, lender liability, partnership agreements, personal injury, professional liability, purchase and sale transactions, rental agreements, intellectual property subrogation, and worker compensation.

95. A method as described in claim 92 further comprising prompting said party implementing said bid-style negotiation to select an opposing party to said dispute, said opposing party being profiled as a defendant if said implementing party is profiled as a plaintiff and profiled as a plaintiff if said opposing party is profiled as a defendant.

96. A method as described in claim 95 wherein said opposing party is identifiable from said data stored within said architecture.

97. A method as described in claim 95 further comprising prompting said party implementing said bid-style negotiation to enter a demand if profiled as a plaintiff or enter an offer if profiled as a defendant.

98. A method as described in claim 97 further comprising notifying said opposing party that said dispute has been submitted and is awaiting their response.

99. A method as described in claim 98 further comprising receiving a response from said opposing party.

100. A method as described in claim 99 further comprising prompting said opposing party to enter a demand if profiled as a plaintiff or enter an offer if profiled as a defendant.

101. A method as described in claim 100 further comprising comparing said entered demand and said entered offer to pre-selected criteria to determine if said dispute is resolved.

102. A method as described in claim 101 further comprising notifying said plaintiff and said defendant if said dispute is resolved or is not resolved.

103. A method as described in claim 101 wherein said pre-selected criteria resolves said dispute:
a) for the value of said demand if said demand is less than said offer; or
b) for the average between said demand and said offer if said demand is within a pre-selected percentage of said offer.

104. A method as described in claim 103 wherein said pre-selected percentage is from about 5% to about 35%.

105. A method as described in claim 101 wherein said offer includes a high value and a low value, said high value and said low value establishing a resolution range.

106. A method as described in claim 105 wherein said pre-selected criteria resolves said dispute:
a) for the value of said demand if said demand is between said high value and said low value of said resolution range; or
b) for said value of said low value of said resolution range if said demand is less than or equal to said low value.

107. A method as described in claim 106 wherein said low value is a fixed value and said high value is a changing value.

108. A method as described in claim 87 further comprising implementing a mediation.

109. A method as described in claim 108 further comprising providing relevant data from said architecture to a mediator in response to said implemented mediation.

110. A method as described in claim 108 wherein said mediation is a real-time on-line mediation.

111. A method as described in claim 108 wherein said mediation is off-line mediation.

112. A method as described in claim 111 wherein at least some evidence for consideration by a mediator are submitted on-line.

113. A method as described in claim 87 further comprising implementing an arbitration.

114. A method as described in claim 113 further comprising providing relevant data from said architecture to an arbitrator in response to said implemented arbitration.

115. A method as described in claim 113 wherein said arbitration is a real-time on-line arbitration.

116. A method as described in claim 113 wherein said arbitration is off-line.

117. A method as described in claim 116 wherein at least some evidence for consideration by said arbitrator is submitted on-line.

118. A method as described in claim 66 further comprising:
providing a fee structure for accessing and using said system.

119. A method as described in claim 118 wherein said fee structure financially rewards resolution and financially penalizes non-resolution.

120. A method of managing non-judicial dispute resolution comprising:
accessing an architecture which stores non-judicial dispute resolution data and allows said data to be retrieved;
inputting non-judicial dispute resolution data for storage in said architecture; and
implementing a full range of a non-judicial dispute resolution procedures;
wherein said architecture is a tiered level architecture, said tiered level architecture having at least a program manager access and a program user access.

121. A method as described in claim 120 further comprising accessing said architecture as a program manager.

122. A method as described in claim 121 further comprising selecting from a plurality of selectable actions so as to retrieve relevant data from said architecture.

123. A method as described in claim 122 wherein said plurality of selectable actions is selected from the group consisting of adding additional users, modifying existing user data, transferring active cases from one user to another user, deactivating users, modifying account registration data, browsing all disputes, generating detailed dispute reports for one or more disputes, generating summary reports of all disputes, browsing all dispute resolution cases, and any combination of one or more of said actions.

124. A method as described in claim 120 further comprising accessing said architecture as a program user.

125. A method as described in claim 124 further comprising selecting from a plurality of selectable options so as to retrieve relevant data from said architecture.

126. A method as described in claim 125 wherein said plurality of selectable options is selected from the group consisting of adding a dispute, responding to a dispute, browsing all disputes, generating dispute reports for all disputes, generating summary reports for all disputes, and any combination of one or more of said options.

127. A method as described in claim 120 further comprising settle-only access.

128. A method as described in claim 120 further comprising:
selecting to forward data relating to dispute resolution to a claims-data storage and retrieval system.

129. A method as described in claim 128 wherein said storage and retrieval system retains said data relating to dispute resolution and enables retrieval of said data by categories.

130. A method as described in claim 129 wherein said storage and retrieval system categories are selected from the group consisting of descriptive nature of the dispute, settlement amount, venue, type of injury, body part injured, sex, age, occupation, and any combination of one or more of said categories.

131. A method as described in claim 128 further comprising accessing said storage and retrieval system after selecting to forward data relating to all disputes to said storage and retrieval system.

132. A method as described in claim 131 wherein said storage and retrieval system data maintained as confidential.

133. A method as described in claim 120
wherein said full range of non-judicial dispute resolution procedures comprise bid-style negotiations, mediation, and arbitration, which are provided as a substantially seamless array of procedures.

134. A method as described in claim 133 further comprising implementing a bid-style negotiation.

135. A method as described in claim 134 wherein said bid-style negotiation is a closed-bid negotiation.

136. A method as described in claim 135 herein said bid-style negotiation is an open-bid negotiation.

137. A method as described in claim 136 further comprising selecting a profile.

138. A method as described in claim 137 wherein said profile is selected from the group consisting of plaintiff and defendant.

139. A method as described in claim 138 further comprising selecting a nature of said dispute.

140. A method as described in claim 139 wherein said nature of said dispute is selected from the group consisting of loans, business transactions, construction, contracts, credit cards, foreclosures, labor and employment, landlord/tenant, lender liability, partnership agreements, personal injury, professional liability, purchase and sale transactions, rental agreements, intellectual property, subrogation, and worker compensation.

141. A method as described in claim 138 further comprising identifying an opposing party to said dispute.

142. A method as described in claim 141 further comprising entering a demand if said selected profile is plaintiff or entering an offer if said selected profile is defendant.

143. A method as described in claim 142 further comprising notifying said opposing party that said dispute has been submitted and is awaiting their response.

144. A method as described in claim 143 further comprising receiving a response from said opposing party.

145. A method as described in claim 144 further comprising receiving a demand from said opposing party in response to an entered offer or receiving an offer from said opposing party in response to an entered demand.

146. A method as described in claim 145 further comprising comparing said demand and said offer to pre-selected criteria to determine if said dispute is resolved.

147. A method as described in claim 146 wherein said pre-selected criteria resolves said dispute:
a) for the value of said demand if said demand is less than said offer; or
b) for the average between said demand and said offer if said demand is within a pre-selected percentage of said offer.

148. A method as described in claim 147 wherein said pre-selected percentage is from about 5% to about 35%.

149. A method as described in claim 148 wherein said offer includes a high value and a low value, said high value and said low value establishing a resolution range.

150. A method as described in claim 149 wherein said pre-selected criteria resolves said dispute:
a) for the value of said demand if said demand is between said high value and said low value of said resolution range; or
b) for said value of said low value of said resolution range if said demand is less than or equal to said low value.

151. A method as described in claim 150 wherein said low value is a fixed value and said high value is a changing value.

152. A method as described in claim 133 further comprising implementing a mediation.

153. A method as described in claim 152 further comprising providing relevant data from said architecture to a mediator in response to said implemented mediation.

154. A method as described in claim 152 wherein said mediation is a real-time on-line mediation.

155. A method as described in claim 152 wherein said mediation is off-line mediation.

156. A method as described in claim 155 wherein at least some evidence for consideration by a mediator are submitted on-line.

157. A method as described in claim 133 further comprising implementing an arbitration.

158. A method as described in claim 157 further comprising providing relevant data from said architecture to an arbitrator in response to said implemented arbitration.

159. A method as described in claim 157 wherein said arbitration is a real-time on-line arbitration.

160. A method as described in claim 157 wherein said arbitration is off-line arbitration.

161. A method as described in claim 160 wherein at least some evidence for consideration by an arbitrator is submitted on-line.

162. A method of managing non-judicial dispute resolution comprising:
accessing an architecture which stores non-judicial dispute resolution data and allows said data to be retrieved;
inputting non-judicial dispute resolution data for storage in said architecture;
implementing a full range of a non-judicial dispute resolution procedures; and
selecting operational support to be used in connection with said non-judicial dispute resolution procedures.

163. A method as described in claim 162 wherein said operational support is selected from the group consisting of reporting services, translation services, interpretation services, structure settlement arrangements, and any combination of one or more of said operational supports.

164. A method of managing non-judicial dispute resolution comprising:
accessing an architecture in response to an implemented non-judicial dispute resolution procedure, said architecture having non-judicial dispute resolution data retrievably stored therein; and inputting additional non-judicial dispute resolution data for retrievable storage in said architecture and for use during said implemented resolution procedure;

wherein said architecture is a tiered level architecture, said tiered level architecture having at least a program manager access and a program user access.

165. A method as described in claim 164 further comprising accessing said architecture as a program manager.

166. A method as described in claim 165 further comprising selecting from a plurality of selectable actions so as to retrieve relevant data from said architecture.

167. A method as described in claim 166 wherein said plurality of selectable actions is selected from the group consisting of adding additional users, modifying existing user data, transferring active cases from one user to another user, deactivating users, modifying account registration data, browsing all disputes, generating detailed dispute reports for all disputes, generating summary reports of all disputes, browsing all dispute resolution cases, and any combination of one or more of said actions.

168. A method as described in claim 165 further comprising accessing said architecture as a program user.

169. A method as described in claim 168 further comprising selecting from a plurality of selectable options so as to retrieve relevant data from said architecture.

170. A method as described in claim 169 wherein said plurality of selectable options is selected from the group consisting of adding a dispute, responding to a dispute, browsing all disputes, generating dispute reports for all disputes, generating summary reports for all disputes, and any combination of one or more of said options.

171. A method as described in claim 165 further comprising settle-only access.

172. A method as described in claim 165 wherein said implemented non-judicial dispute resolution procedure comprises one or more of bid-style negotiations, mediation, and arbitration.

173. A method as described in claim 165 further comprising:

selelting from a plurality of selectable choices so as to retriere relevant data from said architecture;

wherein said selectable choices are selected from the group consisting of informing parties of disputes submitted which request their response, informing parties of settled disputes, marking disputes active, generating priority dispute lists, generating activity reports, providing billing information, generating summary reports for any or all accounts, generating audit reports, and any combination of one or more of said choices.

* * * * *

UNITED STATES PATENT AND TRADEMARK OFFICE
CERTIFICATE OF CORRECTION

PATENT NO.      : 6,766,307 B1
DATED           : July 20, 2004
INVENTOR(S)     : Israel et al.

It is certified that error appears in the above-identified patent and that said Letters Patent is hereby corrected as shown below:

Column 12,
Line 26, now reads "licks on the"; should read -- clicks on the --.

Column 19,
Line 47, now reads "Browse Dispute s List."; should read -- Browse Disputes List. --
Line 49, now reads "b e con figured"; should read -- be configured --.
Line 50, now reads "criteria.  To display"; should read -- criteria.
¶ To display --.
Line 53, now reads "dispute; caption,"; should read -- dispute, caption, --.

Column 20,
Line 13, now reads "types lone"; should read -- types/one --.

Column 22,
Line 28, now reads "expired, no:"; should read -- expired, no --.

Column 28,
Line 19, now reads "retrieval system"; should read -- retrieval system 20 --.

Column 37,
Line 34, now reads "135 herein said"; should read -- 135 wherein said --.

Column 40,
Line 16, now reads "selelting from"; should read -- selecting from --.
Line 17, now reads "retriere relevant data"; should read -- retrieve relevant data --.

Signed and Sealed this

Twenty-eighth Day of September, 2004

JON W. DUDAS
*Director of the United States Patent and Trademark Office*